US012691690B2

(12) United States Patent
Takayama et al.

(10) Patent No.: US 12,691,690 B2
(45) Date of Patent: Jul. 28, 2026

(54) TUBE PRINTER FOR RECORDING IMAGES ONTO A TUBE-SHAPED RECORDING MEDIUM

(71) Applicant: CANON FINETECH NISCA INC., Saitama (JP)

(72) Inventors: Hirohumi Takayama, Moriya (JP); Takeshi Miura, Yokohama (JP)

(73) Assignee: Canon Finetech Nisca Inc., Saitama (JP)

( * ) Notice: Subject to any disclaimer, the term of this patent is extended or adjusted under 35 U.S.C. 154(b) by 188 days.

(21) Appl. No.: 18/536,953

(22) Filed: Dec. 12, 2023

(65) Prior Publication Data

US 2024/0109336 A1 Apr. 4, 2024

Related U.S. Application Data

(63) Continuation of application No. PCT/JP2022/024954, filed on Jun. 22, 2022.

(30) Foreign Application Priority Data

Jun. 25, 2021 (JP) ................................ 2021-105960
Oct. 26, 2021 (JP) ................................ 2021-174804
Jun. 20, 2022 (JP) ................................ 2022-099016

(51) Int. Cl.
*B41J 3/37* (2006.01)
*B41J 3/407* (2006.01)
*B41M 5/00* (2006.01)

(52) U.S. Cl.
CPC .............. *B41J 3/37* (2013.01); *B41M 5/0082* (2013.01)

(58) Field of Classification Search
CPC ....... B41J 2/32; B41J 3/36; B41J 3/407; B41J 3/4073; B41J 3/40733; B41M 5/0082
See application file for complete search history.

(56) References Cited

U.S. PATENT DOCUMENTS 5,833,379 A * 11/1998 Kano ......................... B41J 2/32 400/615.2
2017/0266998 A1 9/2017 Miyashita et al. ..... B41J 11/663
2021/0252875 A1* 8/2021 Goto ......................... B41J 2/325

FOREIGN PATENT DOCUMENTS

| | | |
|---|---|---|
| CN | 210896239 U | 6/2020 |
| JP | 2005-288858 A | 10/2005 |
| JP | 2005-313410 | 11/2005 |
| JP | 2013-202926 | 10/2013 |
| JP | 2016-064535 | 4/2016 |
| JP | 2016-190363 | 11/2016 |
| JP | 2017-164937 | 9/2017 |

(Continued)

OTHER PUBLICATIONS

Hashimoto, MachineTranslationofJP-7003956-B2, 2020 (Year: 2020).*

(Continued)

*Primary Examiner* — Scott A Richmond
(74) *Attorney, Agent, or Firm* — Venable LLP

(57) ABSTRACT

A Bluetooth module is disposed behind a keyboard when viewed from a user side with the user facing this tube printer. Furthermore, the Bluetooth module is disposed behind a display when viewed from the user side with the user facing the tube printer. Furthermore, at least part of the Bluetooth module is disposed overlapping the display in the longitudinal direction of the keyboard.

3 Claims, 17 Drawing Sheets

(56) References Cited

FOREIGN PATENT DOCUMENTS

| | | | | |
|---|---|---|---|---|
| JP | 2020-161097 | | 10/2020 | |
| JP | 7003956 B2 | * | 1/2022 | ................ B41J 3/46 |

OTHER PUBLICATIONS

International Preliminary Report on Patentability dated Dec. 14, 2023 in counterpart Application No. PCT/JP2022/024954 with translation.

Written Opinion of the International Searching Authority dated Aug. 9, 2022 in counterpart Application No. PCT/JP2022/024954 with translation.

International Search Report dated Aug. 9, 2022 in counterpart Application No. PCT/JP2022/024954 with translation.

1 Search Report dated Jun. 17, 2025, in European Patent Application No. 22828469.1.

* cited by examiner

TUBE PRINTER FOR RECORDING IMAGES ONTO A TUBE-SHAPED RECORDING MEDIUM

CROSS-REFERENCE TO RELATED APPLICATION(S)

This application is a continuation of International Patent Application No. PCT/JP2022/024954 filed on Jun. 22, 2022, which claims priority to and the benefit of Japanese Patent Applications Nos. 2021-105960, filed Jun. 25, 2021, 2021-174804, filed Oct. 26, 2021 and 2022-099016, filed Jun. 20, 2022, the entire disclosures of which are incorporated herein by reference.

BACKGROUND OF THE INVENTION

Field of the Invention

Technical Field

The present invention relates to a tube printer that records onto a tube-shaped recording medium.

BACKGROUND ART

Recording apparatuses exist which are capable of forming images on a flexible, tube-shaped recording medium such as electrical wires, hoses, pipes, and the like (called a "tube" hereinafter), such as that described in PTL 1. The recording apparatus conveys the tube with a roller, records an image onto the tube using a thermal head, and then cuts the tube with a cutter.

CITATION LIST

Patent Literature

PTL 1: Japanese Patent Laid-Open No. 2005-313410

In addition to recording text and the like entered by a user from a built-in keyboard onto the tube, the tube printer receives recording data such as text transferred from a host computer, and records that data onto the tube. Conventionally, the host computer and the tube printer have been connected by a communication cable to transfer the recording data from the host computer to the tube printer. When laptop computers began being used as host computers, users began bringing laptop computers and recording apparatuses to work sites, where text and the like were printed onto tubes. In recent years, tablet computers and smartphones, which are smaller than laptop computers, have become widespread, and there is demand for being able to transfer recording data from such external devices to tube printers. Tablet computers and smartphones have wireless communication devices built in. As such, there is demand to make it possible to easily transfer recording data from tablet computers and smartphones to tube printers using wireless communication.

SUMMARY OF THE INVENTION

A tube printer according to the present invention is a tube printer for recording onto a tube-shaped recording medium, the tube printer comprising: a keyboard in which a plurality of keys with which a user inputs information are arranged in a lengthwise direction of the keyboard; a display capable of displaying the information; a cable connected to the display;

a board capable of accepting an input from the keyboard and causing the display to display information corresponding to the input, the board being connected to the cable and disposed behind the keyboard; a conveying roller that conveys the tube-shaped recording medium; a first motor that rotates the conveying roller; a recording head capable of recording, at a recording position, onto the tube-shaped recording medium conveyed by the conveying roller; a cutter that cuts, at a cutting position, the tube-shaped recording medium recorded onto by the recording head and conveyed by the conveying roller; a second motor that operates the cutter; and a Bluetooth module that executes wireless communication according to a Bluetooth standard, wherein the board is capable of receiving information input through the Bluetooth module, and is capable of controlling the first motor and the recording head, in a front-rear direction, which is orthogonal to the lengthwise direction and extends from a front to a rear of the tube printer parallel to a horizontal direction, the display is located further to the rear than the keyboard, in the front-rear direction, the first motor, the second motor, the recording position, and the cutting position are located further to the rear than the keyboard and the board, the display is located further to one side than the recording position in the lengthwise direction, the cutting position is located further to an other side than the recording position in the lengthwise direction, the Bluetooth module is located further to the one side than the first motor, the second motor, and the recording position in the lengthwise direction, and further to the rear than the board, the display, and the cable in the front-rear direction, and the Bluetooth module is disposed such that at least a part of the Bluetooth module overlaps the display in the lengthwise direction.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
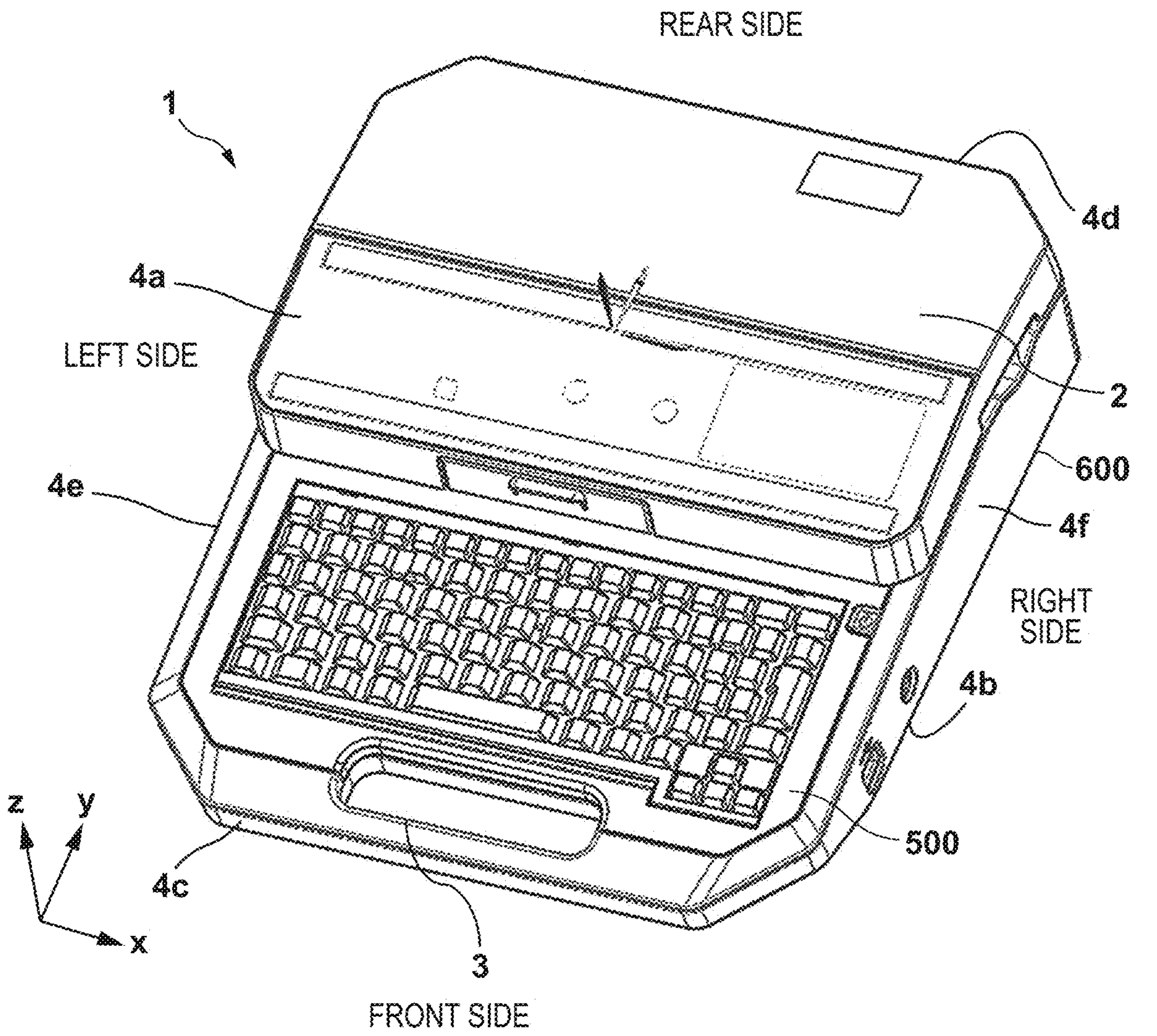
FIG. 1 is a perspective view illustrating the external appearance of a recording apparatus.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

As illustrated in FIG. 1, a recording apparatus 1 is a heat-transfer tube printer that forms an image on a tube-shaped recording medium. In FIG. 1, the recording apparatus 1 is placed on a horizontal surface such as a desk. The x direction and the y direction are parallel to the horizontal surface, and the z direction is parallel to the vertical direction. Note that a conveying direction of a tube T intersects the vertical direction. An opening/closing cover 2 can be opened and closed with respect to the main body of the recording apparatus 1, and is opened and closed when an ink ribbon cassette 30, a guide unit 400, and the like (described later) are inserted and removed, when the tube T is set in the guide unit 400, and the like. A handle part 3 is gripped by a user when carrying the recording apparatus 1 with one hand. Although the handle part 3 is formed as a through-hole in the present embodiment, the handle part 3 may be formed as a non-penetrating depression instead.

Figure 17:
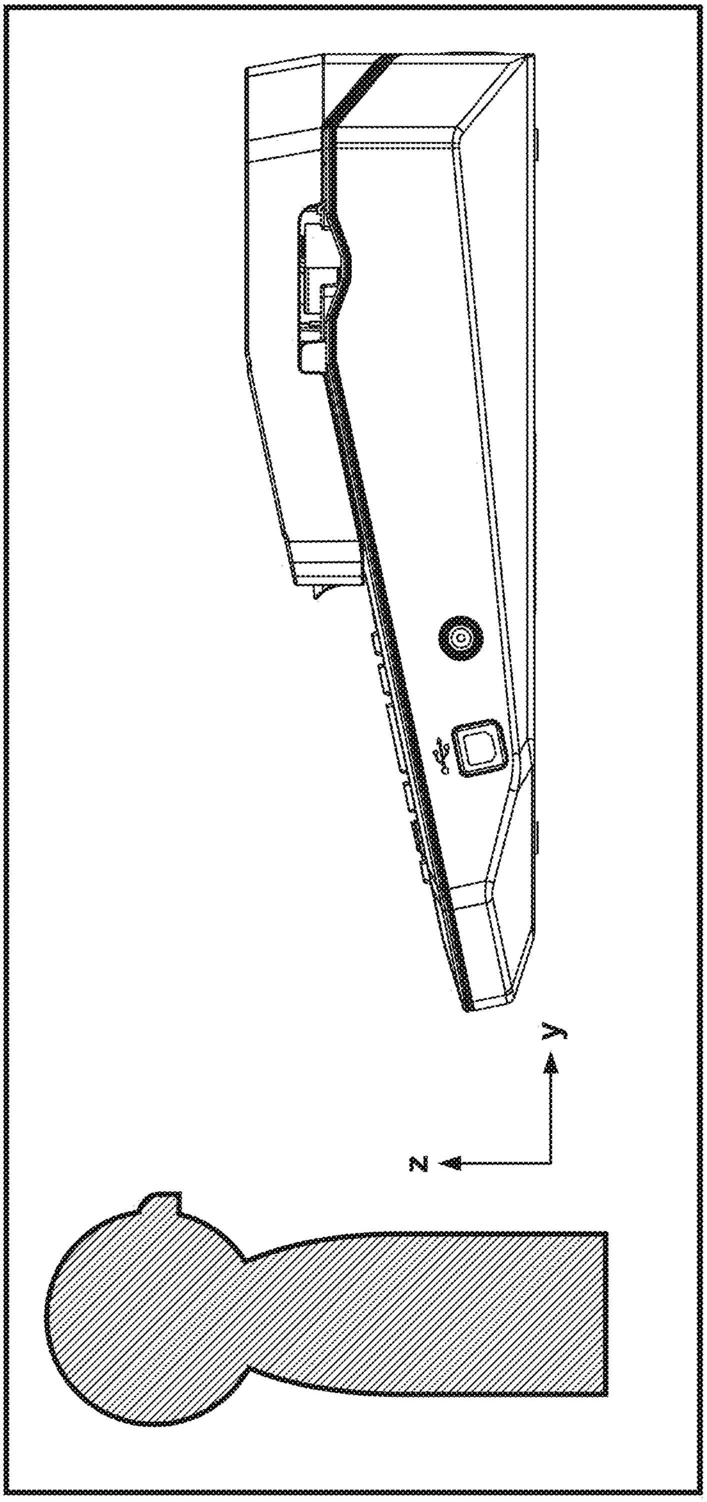
FIG. 17 is a diagram illustrating a positional relationship between each surface of the recording apparatus and a user.

As illustrated in FIG. 1, a housing of the recording apparatus 1 includes a main body upper unit 500, a main body lower unit 600, and the opening/closing cover 2. The housing also has a top surface 4*a*, a bottom surface 4*b*, and four side surfaces 4*c* to 4*f* Of the four side surfaces, a front surface 4*c* is the side surface closest to the user in the y direction from the perspective of the user facing the recording apparatus 1 in order to use the recording apparatus 1, as illustrated in FIG. 17. Note that the y direction is a direction extending from the front to the back of the recording apparatus 1 (a front-rear direction). A rear surface 4*d* is the side surface furthest from the user in the y direction from the perspective of the user facing the recording apparatus 1 in order to use the recording apparatus 1. Returning to FIG. 1, a left surface 4*e* is a side surface connected to the top surface 4*a*, the bottom surface 4*b*, the front surface 4*c*, and the rear surface 4*d*. Likewise, a right surface 4*f* is a side surface connected to the top surface 4*a*, the bottom surface 4*b*, the front surface 4*c*, and the rear surface 4*d*. The right surface 4*f* is located further on the +x side than the left surface 4*e*. The top surface 4*a* is located further on the +z side than the bottom surface 4*b*.

The tube T is inserted from an insertion part (an insertion port) provided in the right surface 4*f* of the housing, conveyed to a discharge port provided in the left surface 4*e* of the housing, and discharged from the discharge port.

Figure 2:
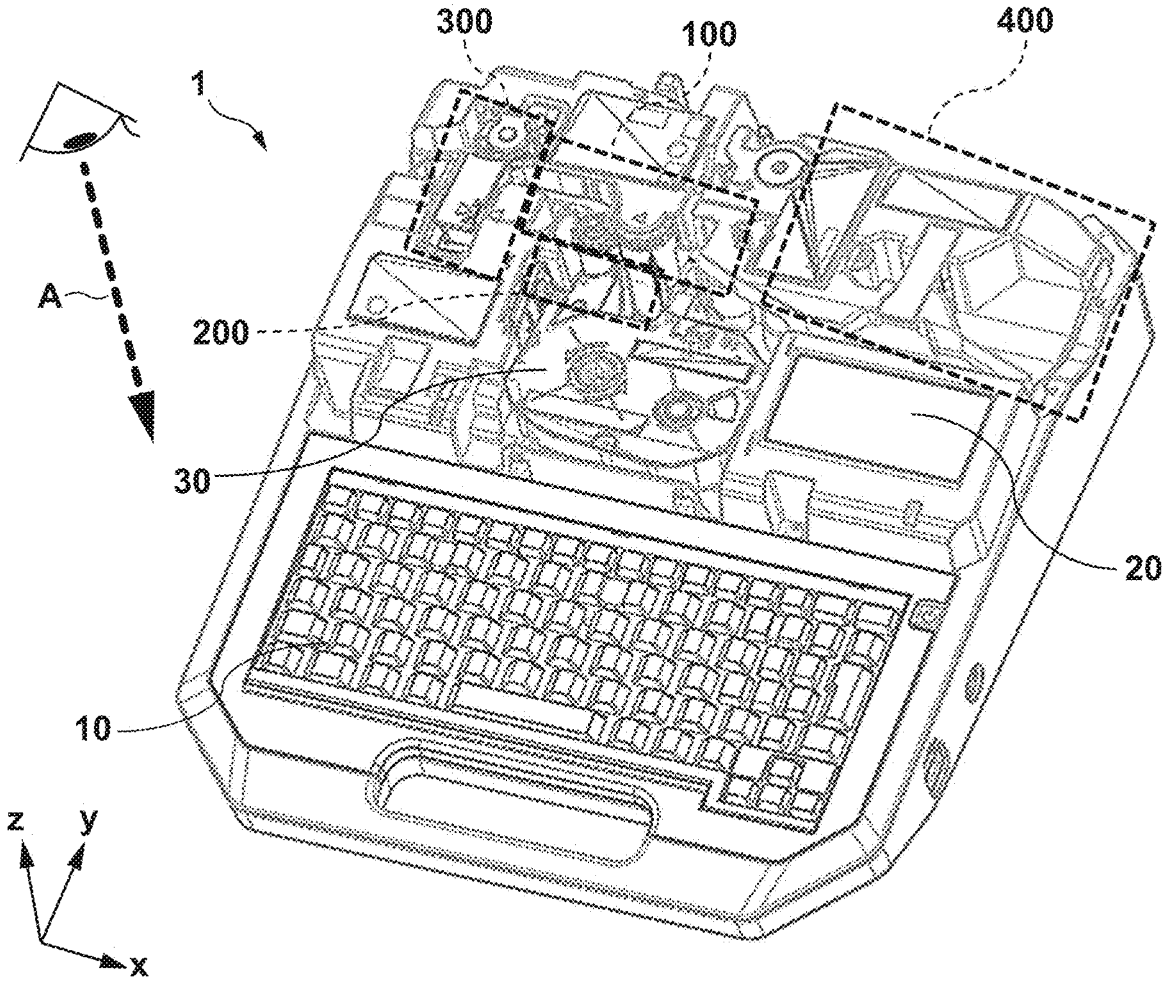
FIG. 2 is a perspective view illustrating the external appearance of the recording apparatus with an opening/closing cover removed.

FIG. 2 illustrates the recording apparatus 1 from which the opening/closing cover 2 has been removed for the sake of simplicity. An operation unit 10 serving as an input unit is a keyboard that is operated by the user to enter printing instructions, text for printing, and the like. The operation surface (instruction entry surface) of the keyboard is provided on the top surface 4*a* side. A display unit 20 includes a liquid crystal display device (LCD) and a display control unit. A display surface of the display unit 20 is provided on the top surface 4*a* side. When the user sets the tube T in the recording apparatus 1, the user passes the tube T through the guide unit 400. A conveying unit 100 includes a first roller that supplies the set tube T to a recording unit 200, a second roller that conveys the tube T from the recording unit 200 to a cutting unit 300, and the like. The recording unit 200 includes a recording head (a thermal head) that records (prints) an image such as text onto the tube T, an ink ribbon cassette 30, and the like. The cutting unit 300 cuts the tube T onto which the image was recorded by the recording unit 200.

Operation Unit

An operation unit 10 on which the user makes entry operations is a keyboard, for example. The keyboard includes a plurality of hardware keys, and a printed circuit board provided with switches for detecting that corresponding ones of the keys have been pressed. The plurality of hardware keys include function keys, letter/number/symbol keys, a space key, a conversion key, arrow keys, a return key, and the like. Physical keys, such as the letter/number/symbol keys, and symbol keys, are arranged in a QWERTY layout. By manipulating these keys, the user enters data such as letters and numbers constituting recording information (recording content), as well as the type and size of the recording medium, recording conditions, and the like, and sets these in the recording apparatus 1. When the user uses the recording apparatus 1, they face the front surface 4*c* of the recording apparatus 1 during use. In other words, from the user's perspective, the front surface 4*c* side of the recording apparatus 1 is the front, and the rear surface 4*d* side is the rear. As illustrated in FIG. 1, the keyboard is disposed on the front surface 4*c* side of the recording apparatus 1.

The keyboard is disposed such that the lengthwise direction is parallel to the x direction. The front-rear direction is orthogonal to the lengthwise direction of the keyboard, parallel to the horizontal direction, and parallel to the y direction.

The keyboard has a plurality of keys arranged along the lengthwise direction of the keyboard (parallel to the x direction). Additionally, the keys of the keyboard are arranged such that the space key is on the front side. The keyboard is also disposed at an incline such that the front surface 4*c* side is lower than the rear surface 4*d* side. Disposing the keyboard in this manner places the keyboard at an incline that decreases in height with proximity to the user, which makes it easier for the user to enter information. In addition, as illustrated in FIG. 17, from the perspective of a user facing the recording apparatus 1 in order to use the recording apparatus 1, the aforementioned handle part 3 is provided further toward the front than the keyboard.

Display Unit

Figure 5:
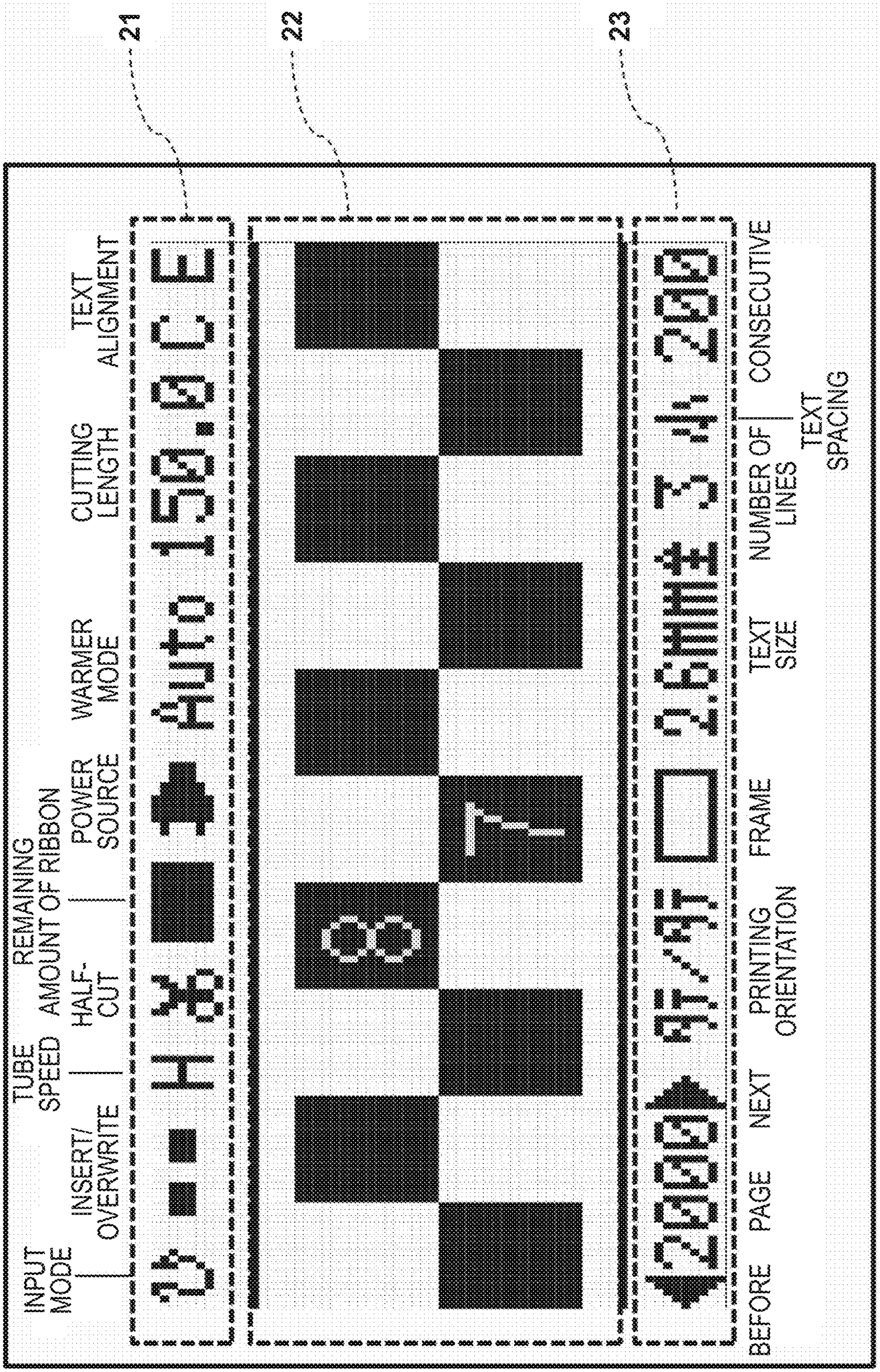
FIG. 5 is a diagram illustrating content displayed in a display unit.

A display in the display unit 20 is disposed closer to the insertion part of the tube T than the recording head. The display unit 20 is a part that, in addition to displaying content to be recorded onto the tube T, is capable of displaying information pertaining to the details of various settings of the tube printer. As illustrated in FIG. 5, the display unit 20 includes a liquid crystal display (LCD) including display areas 21, 22, and 23. Note that the lengthwise direction of the display is parallel to the x direction. Tube printer setting items are printed at the top of the display area 21 and the bottom of the display area 23. The display area 21 displays the current input mode (hiragana/katakana/alphanumeric), overwrite/insert, a printing speed (H/M/L), half-cut (ON/cut line printing), a remaining amount of ribbon, and the connected power source (an AC power source or a battery). The display area 21 further displays the mode of a tube warmer (auto/manual), a cutting length of the tube, and text alignment (C (center)/R (right)/L (left)/E (justified)). The display area 22 displays letters, numbers, and symbols (collectively referred to as "text" hereinafter) entered from the keyboard.

Data such as letters, numbers, and the like serving as information that corresponds to entries made from the keyboard of the operation unit 10 is displayed in the display area 22. Accordingly, the keyboard and the display are electrically connected to a control board, which will be described later. Text and content entered from the keyboard are sent to the display via the control board, which will be described later, and display processing is performed in the display. Text displayed in the display area 22 as the recording content is recorded onto the tube T. The display area 23 displays recording parameters such as text size and the like. The number of sheets printed thus far, the printing orientation (landscape), frames (with/without), the text size, the number of lines, the text spacing (large/small), and the number of consecutive sheets recorded are displayed as the recording parameters.

In the present embodiment, the display unit 20 includes a liquid crystal display and setting items printed in the vicinity thereof, but the display unit 20 may only include the display. Additionally, the panel of the display need not be a liquid crystal panel, and may be another type of panel such as, for example, an organic EL (electroluminescence) panel or a plasma display panel.

Guide Unit

When the user sets the tube T in the recording apparatus, the tube T is passed through the guide unit 400 to reach the conveying unit 100. As illustrated in FIG. 2, the guide unit 400 is disposed upstream from the recording unit 200 in the conveying direction of the tube T (the direction toward −x). When viewed parallel to the z direction (when viewed in the direction of arrow A in FIG. 2), the guide unit 400 is disposed so as not to overlap the display. In other words, the guide unit 400 and the display are disposed so as not to overlap in the y direction. This reduces the thickness of the recording apparatus 1, i.e., the size in the z direction, and makes it easier to attach the guide unit 400 to the recording apparatus 1.

Figure 3:
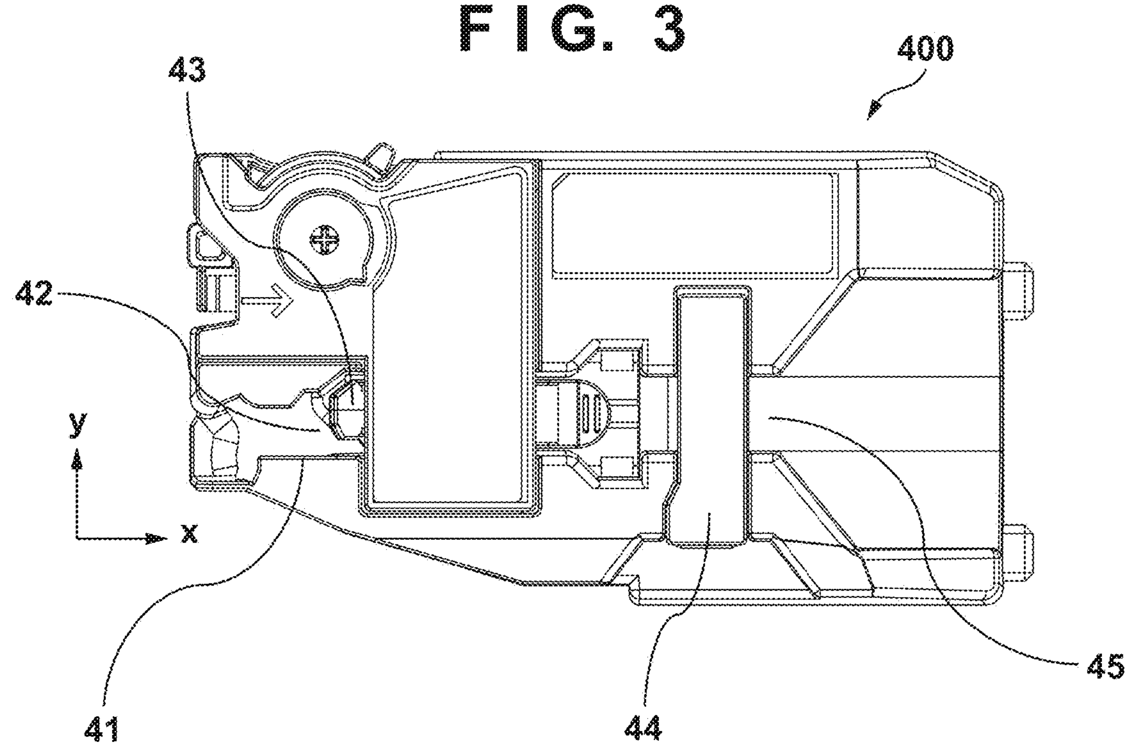
FIG. 3 is a diagram illustrating the external appearance of a guide unit.

FIG. 3 is a diagram illustrating the guide unit 400. The guide unit 400 includes a guide wall 41 that forms a conveying path through which the tube T passes when the user sets the tube T, and a reference surface 42 that serves as a reference for the conveying of the tube T and the recording position. The guide unit 400 also had a pressing unit 43 that presses the tube T toward the reference surface 42, a cleaner 44 that contacts the outer circumference of the conveyed tube T and cleans the tube T, and an insertion part 45 into which the tube T is inserted when the tube T is set in the guide unit. Note that the roller conveying the tube T is disposed downstream from the guide unit 400 in the conveying direction of the tube T. A motor serving as a drive source for the roller is also disposed downstream from the guide unit 400.

In the recording apparatus 1 of the present embodiment, tubes T ranging from 1.5 mm to 10 mm in diameter can be conveyed. However, with a thin tube T, when the tube T is conveyed while being pushed out from the guide unit 400, the tube T may bend or buckle due to frictional resistance between the tube T and the conveying path. To that end, the conveying unit 100 disposed downstream from the guide unit 400 conveys the tube T while pulling the tube T. Accordingly, the motor conveying the tube T is disposed neither in the interior of the guide unit 400 nor in a region overlapping the guide unit 400 as viewed parallel to the z direction, i.e., a region further to the rear of the display. Note that a part of the guide unit 400 may be disposed so as to enter under the display, to the extent that it is not difficult to attach the guide unit 400 to the recording apparatus 1. In other words, an arrangement (an overlapping arrangement) may be employed in which although a part of the guide unit 400 overlaps the display in the y direction, other parts aside from that part do not overlap the display in the y direction.

The cleaner 44 is disposed in the conveying path of the tube T of the guide unit 400. The cleaner 44 is disposed upstream from the pressing unit 43 in the conveying direction of the tube T, i.e., on the +x side. The cleaner 44 is constituted by an elastic member such as a sponge, a wiping member such as a nonwoven fabric, and a frame member. When the tube T is conveyed through the interior of the guide unit 400, the tube T moves while the surface of the tube T contacts the wiping member of the cleaner 44. As a result, adhering objects are removed from the surface of the tube T before the recording by the recording unit 200.

Figure 4:
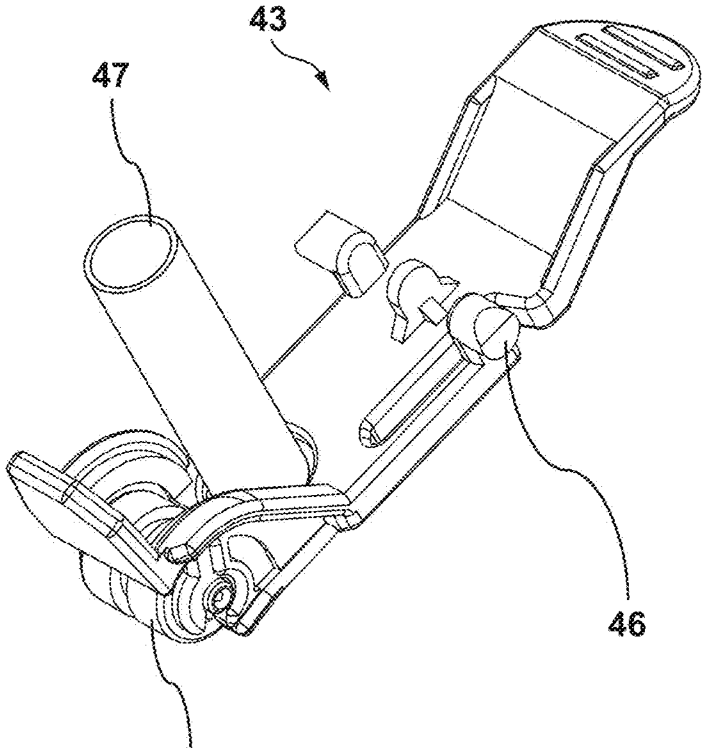
FIG. 4 is a diagram illustrating a pressing unit.

As illustrated in FIG. 4, the pressing unit 43 includes a center shaft 46, a spring 47 serving as a biasing member, and a roller 48. The pressing unit 43 is disposed so as to be capable of pivoting about the center shaft 46. When the tube T is set in the guide unit 400, the roller 48 contacts the tube T under the biasing force of the spring 47, and the tube T is pressed toward a reference wall (the reference surface 42).

The guide unit 400 can be attached and removed, and can also be replaced. A tube warmer unit can be provided as a unit which the guide unit 400 can be replaced. The tube warmer unit includes a heater for heating the conveyed tube T. The tube warmer unit is used when recording on the tube T in cold environments. The tube warmer unit heats the conveyed tube T on the upstream side of the recording unit 200 so as to warm and soften the tube T, which is hardened due to the cold, before recording. A label cassette in which a label on which an image is recorded is rolled up and stored can be given as an example of another unit which can replace the guide unit. Regardless of which unit is used, the tube T is conveyed by the conveying unit, which will be described later.

Conveying Unit/Recording Unit

Figure 6:
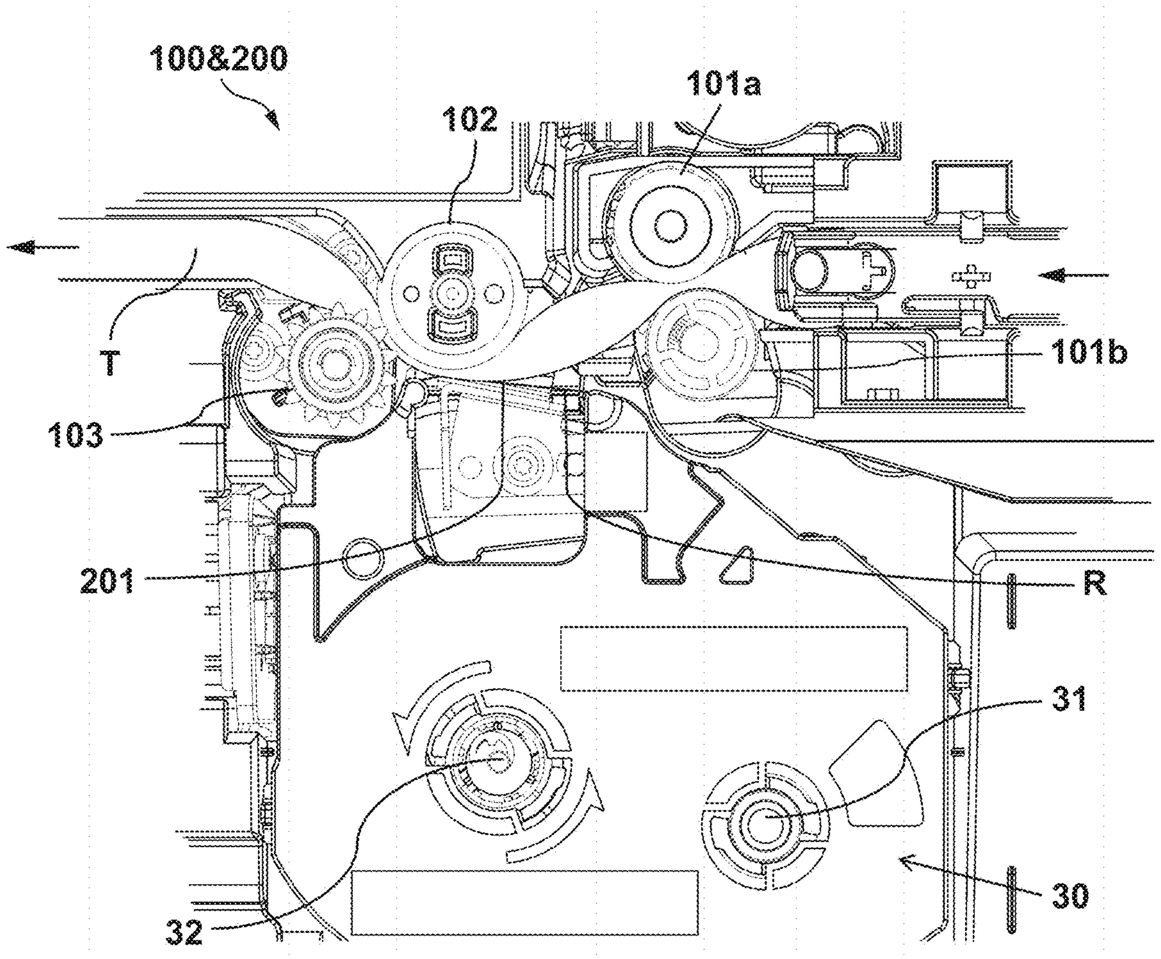
FIG. 6 is a diagram illustrating the configurations of a conveying unit and a recording unit.

The conveying unit 100 is a part including a first roller pair for performing conveying processing that conveys the tube T. The recording unit 200 is a part that can record recording information on the tube T conveyed by the conveying unit 100, using a recording head. The conveying unit 100 and the recording unit 200 are sometimes collectively referred to as a print engine. FIG. 6 is a diagram illustrating the configurations of the conveying unit 100 and the recording unit 200. First rollers **101*a* and 101*b* constitute the first roller pair that conveys the tube T to a recording head 201. The recording head 201 and a platen roller 102 (a conveying roller) are provided downstream from the first roller pair in the conveying direction of the tube T. A second roller 103 is disposed downstream from the recording head 201 and the platen roller 102. The recording head 201 is provided opposite the platen roller 102 with the tube T located therebetween. The second roller 103 is provided opposite the platen roller 102 at a different position from the recording head 201 in a circumferential direction of the platen roller 102. The recording head 201 has a predetermined number of thermal elements arranged in a direction orthogonal to the conveying direction of the tube T. By selectively causing the thermal elements to emit heat, ink on an ink ribbon R stored in the ink ribbon cassette 30 is transferred to the tube T. In the present embodiment, the tube T is conveyed by the first rollers 101***a* and 101*b*, the platen roller 102, and the second roller 103. However, a configuration may be employed in which the first rollers 101*a* and 101*b* and the second roller 103 are not provided, and the platen roller 102 conveys the tube T.

The ink ribbon cassette 30 stores the ink ribbon R, which is rolled up into a roll, in a ribbon supply reel 31. The ink ribbon R is supplied from the ribbon supply reel 31 to the recording head 201 and is wound on a ribbon winding reel 32. The ribbon winding reel 32 rotates using a main motor, which will be described later, as a drive source. If the recording head 201 and the ink ribbon cassette 30 are disposed at a distance from each other, the ink ribbon R drawn out from the ink ribbon cassette 30 lengthens and breaks more easily. The ink ribbon cassette 30 is therefore disposed near the recording head 201.

The recording head 201 records an image (recording content) by moving from a retracted position to a recording position and pressing the ink ribbon R against the tube T. The recording position is a position of the recording head 201 when the recording head 201 forms a nip for recording onto the tube T with the platen roller 102. PVC (polyvinyl chloride) can be given as an example of the material of the tube T. The PVC tube T is crushed (flattened) when passing between the recording head 201 and the platen roller 102 in the recording unit 200, but returns to its original tubular shape after passing through the recording unit 200.

Cutting Unit

As illustrated in FIG. 2, the cutting unit 300, which cuts a recording medium (e.g., a tube or a label) at a cutting position, is disposed downstream from the recording unit 200 in the conveying direction. The cutting unit 300 has a cutter blade (a cutter) and a cutter receiving member, and makes a half cut, in which part of the tube T remains connected, or a full cut, in which the tube T is fully cut, at the cutting position, which is downstream from the recording position of the recording head 201 in the recording unit 200. The full cut and the half cut may be collectively referred to as cutting processing.

A half cut is used when the user wishes to take a tube T which is partially connected and has been recorded onto, and separate and use that tube T at a later time. In the tube printer of the present embodiment, the amount of the tube cut by a half cut is set such that the tube requires a separation force of 10 N to 25 N to be separated. This makes the tube T less likely to tear before the user separates the tube T.

When the tube T is fully cut, the end (tip) of the tube T extends from a discharge port (not shown) provided in the left surface 4*e* of the housing. The user holds the end of the tube T that protrudes from the housing, and removes the fully-cut tube T from the discharge port. In order for the user to remove the fully-cut tube T, it is necessary for the length from the tip of the tube T (the end on the downstream side in the conveying direction) to the cutting position to be longer than the distance from the discharge port in the housing to the cutter blade. In order to make a minimum cutting length, which is the minimum length that can be cut, as short as possible, the cutting unit 300 may be disposed as far downstream as possible in the conveying direction, i.e., in a position close to the left surface 4*e* of the housing.

Note that there are cases where a cutting unit 300 only capable of half cuts or full cuts is installed.

Internal Configuration

Figure 7:
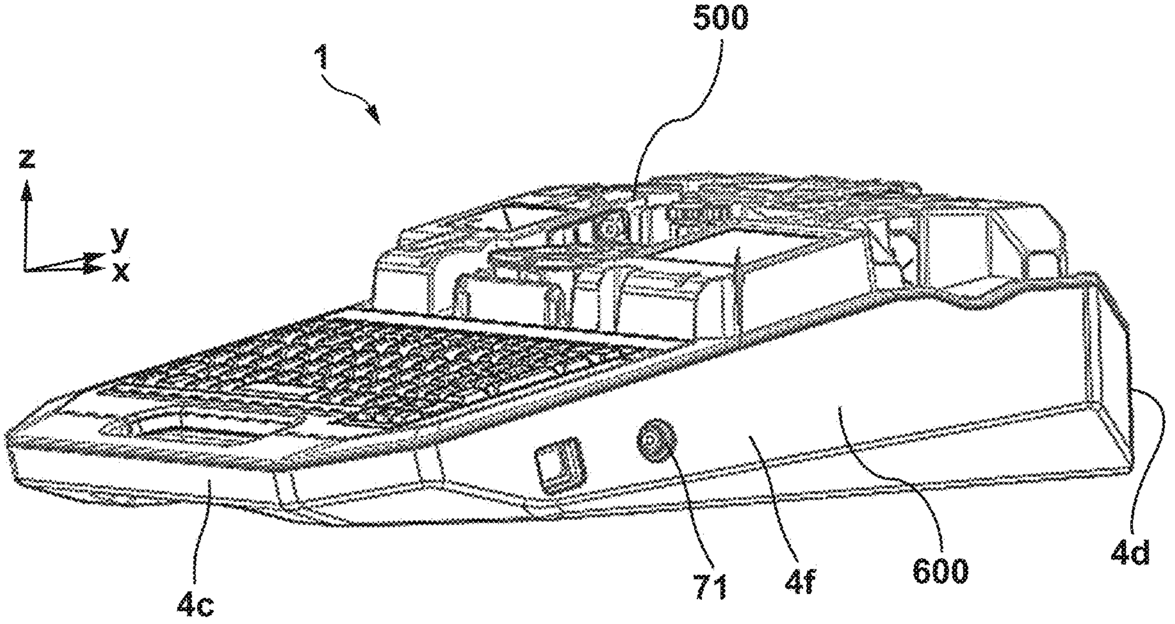
FIG. 7 is a perspective view illustrating a main body upper unit and a main body lower unit.

FIG. 7 is a perspective view of the recording apparatus 1. As illustrated in FIG. 7, the recording apparatus 1 is broadly divided into the main body upper unit 500 and the main body lower unit 600. Note that the height of the front surface 4*c* is lower than the height of the rear surface 4*d*. Therefore, there is a larger storage space inside the housing on the rear surface 4*d* side than on the front surface 4*c* side. A power connector 71 to which a DC power source (an AC/DC adapter) is connected is provided in the right surface 4*f* The recording apparatus 1 operates under power supplied from the power connector 71 or a battery, which will be described later.

Figure 8:
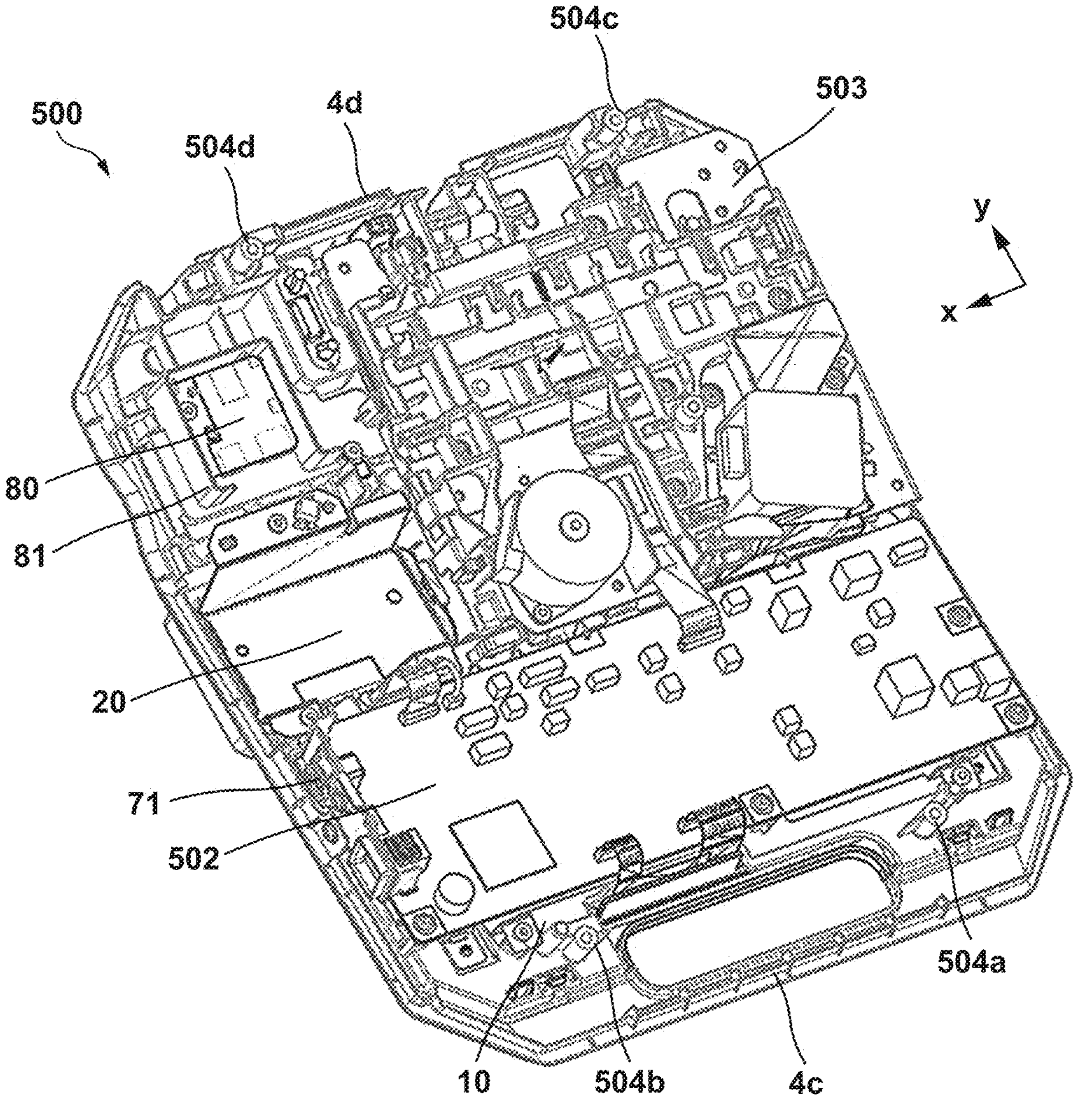
FIG. 8 is a perspective view illustrating the configuration of the main body upper unit.

FIG. 8 is a perspective view illustrating the configuration of the main body upper unit 500. As illustrated in FIG. 8, a keyboard, a display, a control board 502, the conveying unit 100, the recording unit 200, and the cutting unit 300 are fixed to a top surface cover 501, which serves as a base member. Of these, the conveying unit 100, the recording unit 200, and the cutting unit 300 form a unit 503. In other words, the unit 503 is fixed to the top surface cover 501. A control unit 70 including a CPU is mounted on the control board 502, and thus the control board 502 can control motors, the recording head 201, and the like. Because a large number of components are mounted on the control board 502, it is necessary to provide a large area for the control board 502 to be disposed inside the recording apparatus 1. Accordingly, the control board 502 is disposed behind the keyboard provided in the operation unit 10. Fixing parts 504*a* to 504*d* are provided for fixing the top surface cover 501 and a bottom surface cover 601, which will be described later, and screws inserted from the bottom surface cover 601 side are threaded in.

In addition, a metal plate component for fixing the display is disposed on the behind side of the display. This metal plate component is provided to fix the display and prevent the display from becoming charged. In addition, metal components such as a driver IC (integrated circuit) of the display and a flexible cable 91 for connection are present in the vicinity of the display.

As illustrated in FIG. 8, a Bluetooth module 80 is disposed further toward the rear than the control board 502 and the display, as seen from the front surface 4*c* side. This is because the interior of the housing is larger on the rear surface 4*d* side than on the front surface 4*c* side. The keyboard is inclined downward toward the front side such that the user can make inputs more easily. As such, the interior of the housing is smaller on the front surface 4*c* side. A resin wall part 81 is provided in the periphery of the Bluetooth module 80. The wall part 81 is formed by synthetic resin molding using, for example, a mold (a metal mold).

The Bluetooth module 80 is disposed so as not to overlap the control board 502 and the display when viewed parallel to the z direction. In other words, the module is disposed so as not to overlap those parts in the y direction (the front-rear direction). Accordingly, the Bluetooth module 80 can be fixed to the top surface cover 501 using screws from the same direction in which the display, the control board 502, and the unit 503 are fixed to the top surface cover 501 using screws, which makes assembly easier during manufacturing.

Figure 9:
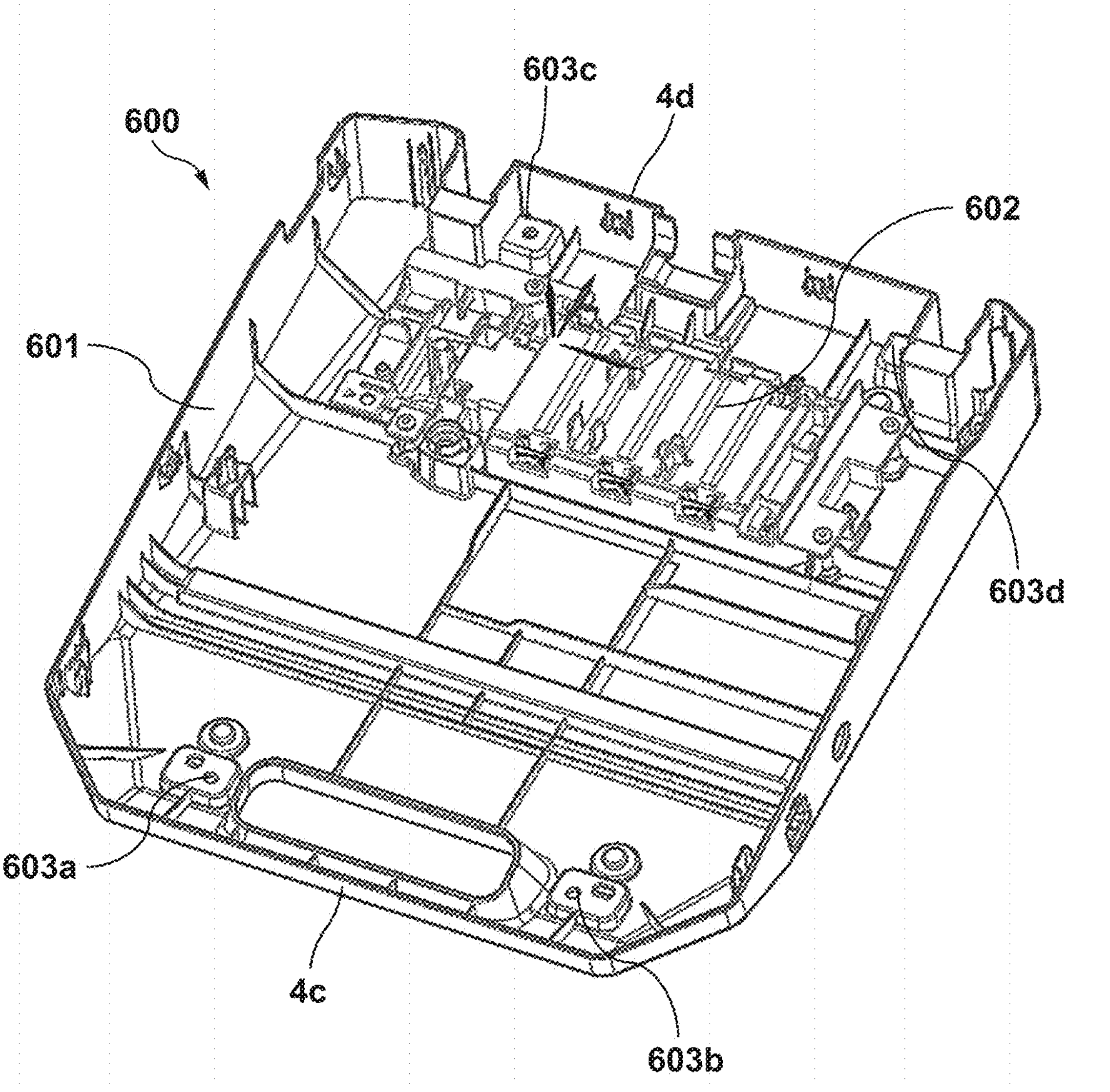
FIG. 9 is a perspective view illustrating the configuration of the main body lower unit.

FIG. 9 is a perspective view illustrating the main body lower unit 600. A battery box 602 serving as a battery housing part for storing a battery serving as part of a power source unit 40 is fixed to the bottom surface cover 601, which is a base member. The battery box 602 is electrically connected to the control board 502 by a power cable (FIG. 12), which will be described later. When the battery is stored in the battery box 602 and the AC/DC adapter is not connected to the power connector 71, the recording apparatus 1 operates using power supplied from the battery. Fixing parts 603*a* to 603*d* are provided in positions opposite the fixing parts 504*a* to 504*d*, respectively, and each has a through-hole through which a screw is inserted from the rear surface side of the bottom surface cover 601.

The battery box 602 is provided in a position that does not overlap a main motor 104 and a sub-motor 202 when viewed parallel to the z direction. The battery box 602 is provided in a region overlapping the conveying unit 100 and the guide unit 400. This is because providing the battery box 602 in a position that overlaps the main motor 104 and the sub-motor 202, which are large components, would increase the thickness of the recording apparatus 1. As such, the arrangement of the present embodiment is advantageous in terms of making the recording apparatus 1 thinner. The battery box 602 is provided such that the battery, metal components, and the like do not overlap the Bluetooth module 80 when viewed parallel to the z direction. As a result, metal components such as the battery and a power cable 93 (see FIG. 12) are distanced from the Bluetooth module 80.

The recording apparatus 1 is configured such that the main body upper unit 500 and the main body lower unit 600 are fixed to each other, and furthermore, the opening/closing cover 2 is connected to the main body upper unit 500 so as to be capable of opening and closing freely.

Figure 10:
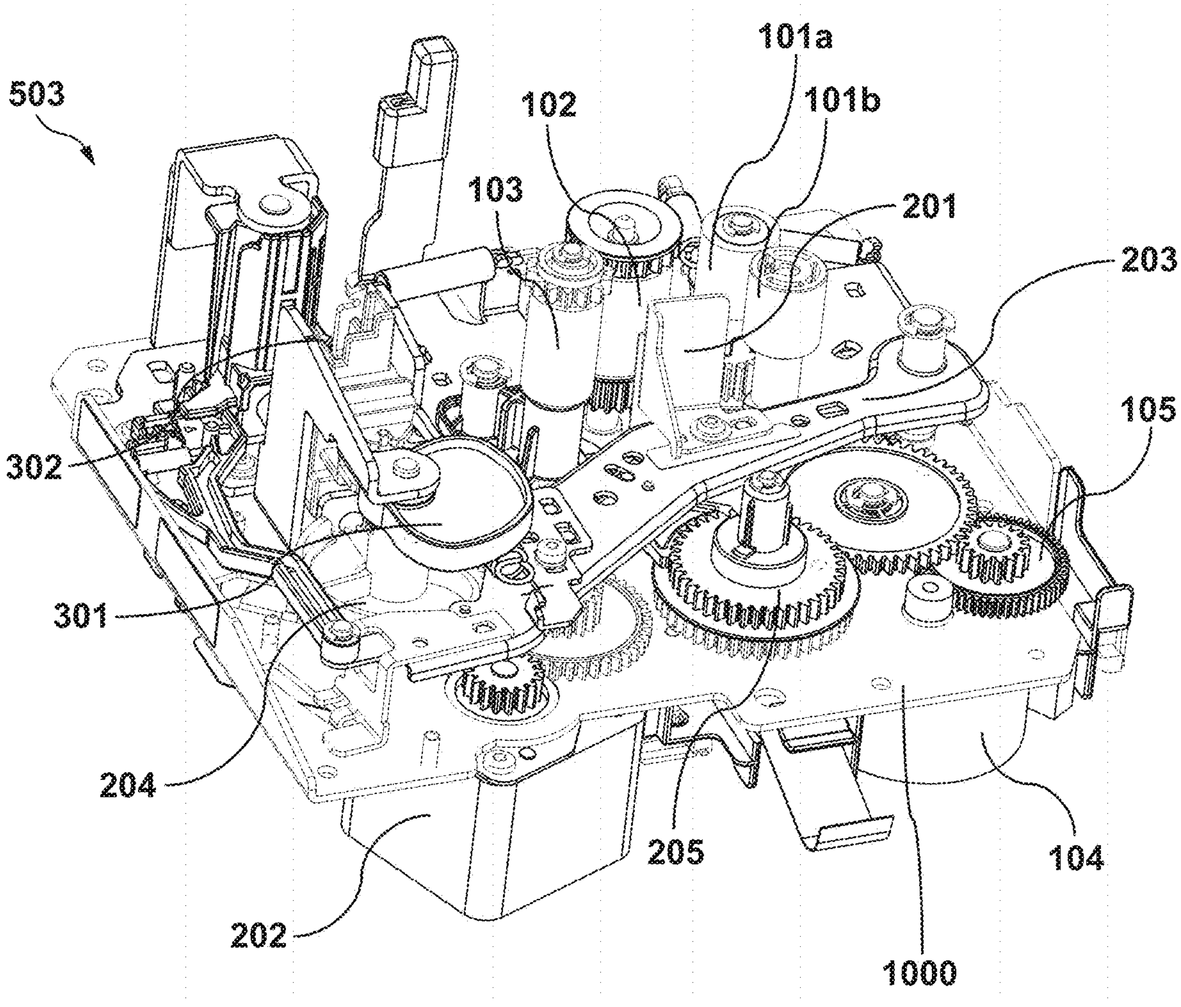
FIG. 10 is a perspective view of a drive unit.

FIG. 10 is a perspective view illustrating the configuration of the unit 503. The unit 503 includes the main motor 104, a drive transmission unit 105, the first rollers 101*a* and 101*b*, the platen roller 102, the second roller 103, the recording head 201, and a recording head holding unit 203.

The main motor 104 is a common drive source that drives the second roller 103, the platen roller 102, the first rollers 101*a* and 101*b*, and the ribbon winding reel 32. The main motor 104 is a stepping motor, for example. Switching between feeding the tube T forward or backward is performed by the stepping motor rotating forward or in reverse. The conveying speed of the recording apparatus 1 can be changed in three stages, from high speed to low speed. The control unit 70 changes the conveying speed by controlling the driving of the main motor 104. Drive force of the main motor 104 is supplied to a winding spool of the ink ribbon cassette 30 to collect the ink ribbon R after recording onto the tube T ends.

The first rollers 101*a* and 101*b* constitute a first roller pair. The first roller 101*b* can move both toward and away from the first roller 101*a*. The first roller 101*b* moves in accordance with operations for opening and closing the opening/closing cover 2 through a linkage mechanism. When the opening/closing cover 2 is moved from a closed state to an open state, the first roller 101*b* moves away from the first roller 101*a*. Conversely, when the opening/closing cover 2 is moved from an open state to a closed state, the first roller 101*b* moves toward the first roller 101*a*.

In the present embodiment, the movement of the first roller 101*b* and the opening/closing of the opening/closing cover 2 are linked by a linkage mechanism, but this is merely one example. A form in which the first roller 101*b* is moved by the user manipulating a lever provided separately may be employed instead.

Furthermore, the unit 503 includes the sub-motor 202, drive transmission units 204, 205, and 301, and a cutter 302. The sub-motor 202 moves the recording head 201 between the recording position and the retracted position. The recording position is a position for recording an image after sandwiching the tube T with the platen roller 102. The retracted position is a position that is farther away from the platen roller 102 than the recording position, and is a position where no image is recorded. Furthermore, the sub-motor 202 drives the cutting unit 300 that cuts the tube T. The sub-motor 202 may also be realized by a stepping motor. The operation of cutting the tube T is performed by the sub-motor 202 driving forward and in reverse. The control unit 70 adjusts a cutting depth of the cutting unit 300 by adjusting the number of pulses when driving the sub-motor 202.

It is preferable for the cutting position of the tube T to be in the vicinity of the discharge port of the housing to facilitate the removal of the cut tube T. Accordingly, the cutting unit 300 is disposed downstream from the housing in the conveying direction of the tube T, i.e., in the vicinity of the left surface 4*e*.

The present embodiment describes a form in which the control unit 70 of the control board 502 controls the sub-motor 202 to perform the cutting processing by the cutting unit 300. However, instead of the control unit 70 controlling the sub-motor 202, a form in which the sub-motor 202 drives the cutting unit 300 in response to the user pressing a button may be employed.

The main motor 104, the sub-motor 202, the drive transmission units 204, 205, and 301, and the cutter 302 are attached to a metal frame 1000, which is a base member. In addition, a bracket for storing electrical cables used for electrical components such as the motors in a bundle is attached to the frame 1000. The bracket is fixed to the frame 1000 using screws. In this manner, the unit 503 is an integrated unit in which various parts are fixed to the frame 1000. The various parts include the conveying unit 100 including the first rollers 101 and the second roller 103, the recording unit 200 including the recording head 201 and the recording head holding unit 203, and the cutting unit 300 including the cutter 302. The various parts further include the main motor 104, the sub-motor 202, the drive transmission units 105, 204, 205, and 301 that transmit the drive force of these motors, the bracket for the electrical cables, and the like. The unit 503 is attached to the top surface cover 501 using screws. The recording unit 200 and the conveying unit 100 are disposed upstream from the cutting unit 300 in the conveying direction of the tube T.

The drive transmission unit 105 includes a plurality of gears and the like that transmit the drive force (rotational force) generated by the main motor 104 to the first rollers 101*a* and 101*b*, the platen roller 102, the second roller 103, and the like. The drive transmission unit 205 includes a plurality of gears and the like that transmit the drive force (rotational force) generated by the main motor 104 to the ribbon winding reel 32. The drive transmission unit 204 includes gears, cams, and the like that move the recording head 201 by transmitting the drive force (rotational force) generated by the sub-motor 202 to the recording head holding unit 203. The drive transmission unit 301 includes gears, cams, and the like that move the cutter 302 of the cutting unit 300 using the drive force (rotational force) generated by the sub-motor 202.

The main motor 104 is disposed behind the conveying unit 100 in order to shorten the distance between the drive source and the transmission destination of the drive force and reduce drive force transmission loss. Like the main motor 104, the sub-motor 202 is disposed behind the cutting unit 300 in order to shorten the distance between the drive source and the transmission destination of the drive force.

In this manner, the drive components related to all of the conveying, recording, and cutting are consolidated in the unit 503, and the main body upper unit 500 to which the unit 503 is fixed therefore inevitably becomes heavier.

Tube Setting Method

When the tube T is set in the recording apparatus 1, the user inserts the tube T from the insertion part 45 of the guide unit 400 with the opening/closing cover 2 open. The inserted tube T is guided by the guide wall 41 and brought between the first rollers 101*a* and 101*b*. In addition, the tube T is conveyed while being pressed toward the reference surface 42 by the pressing unit 43. When the user sets the tube T, the tube T is inserted while being pressed against the reference surface 42 by the pressing unit 43.

Bluetooth Module Arrangement

Bluetooth (registered trademark), which is a wireless communication standard, is a standard suitable for relatively low-speed communication over a small range. For example, Bluetooth low energy is capable of communication at 2 Mbps up to a range of about 10 m. On the other hand, Wi-Fi (registered trademark), which is also a wireless communication standard, is a standard suitable for high-speed communication over a wide range. Wi-Fi is capable of communication at 100 Mbps to 200 Mbps up to a range of about 100 m. Wi-Fi is capable of high-speed communication over a wide range, but also consumes a large amount of power, consuming more than 10 times the power of Bluetooth low energy. In the tube printer, the information transmitted as the content to be recorded onto the tube T has a small data size, such as text. The printer therefore consumes little power and can therefore be operated by a battery. For this reason, Bluetooth is suitable as the standard for wireless communication with external devices, such as host computers and the like.

Figure 11:
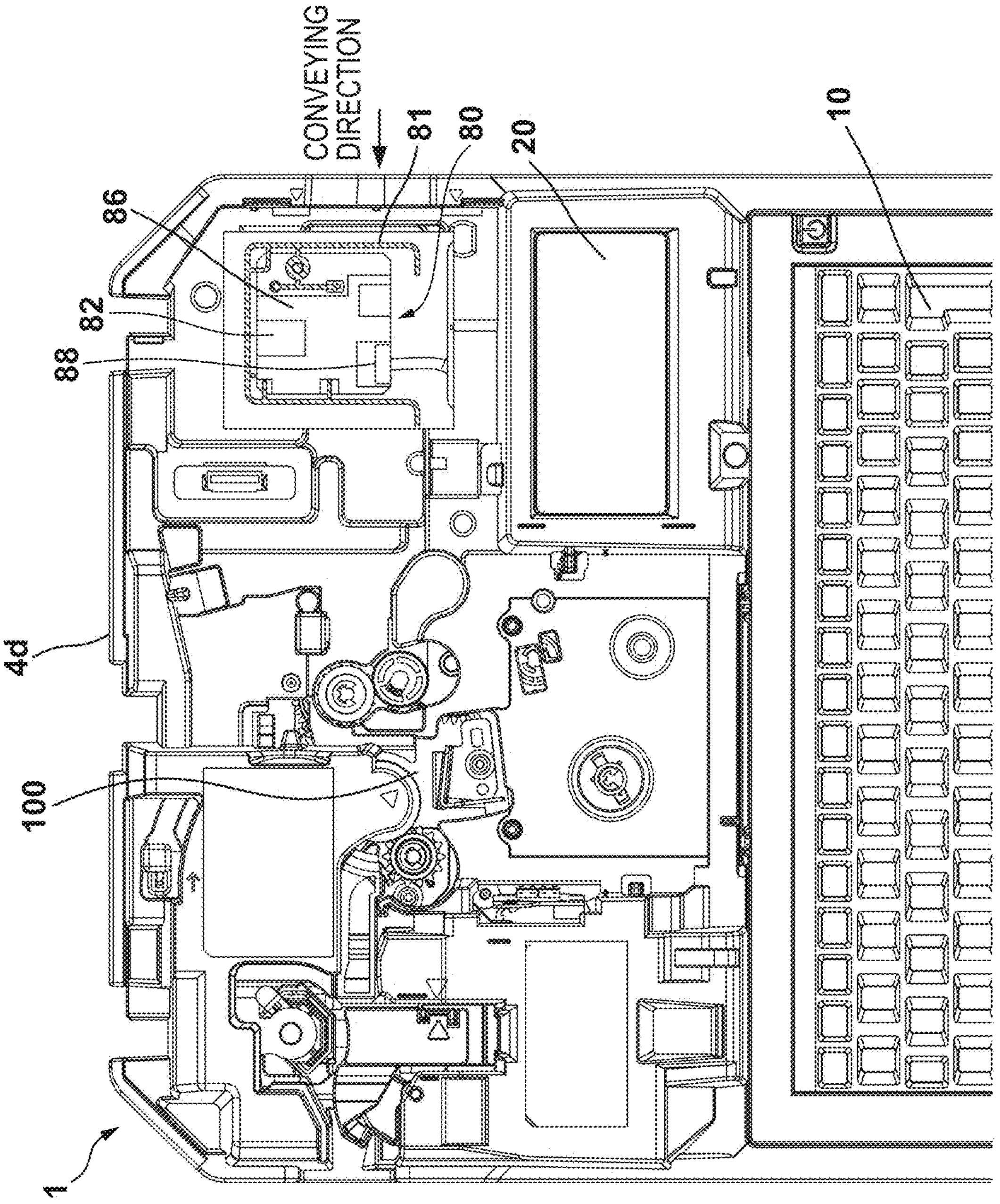
FIG. 11 is a diagram illustrating the position of a Bluetooth module.
Figure 11:
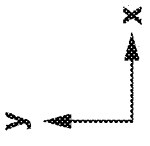

As illustrated in FIG. 11, the Bluetooth module 80 is disposed further toward the rear than the keyboard and the display, as seen from the user side, in a state where the user faces the recording apparatus 1. In FIG. 11, the conveying direction is the −x direction, and the Bluetooth module 80 is disposed upstream from the recording unit 200 in the conveying direction.

Figure 12:
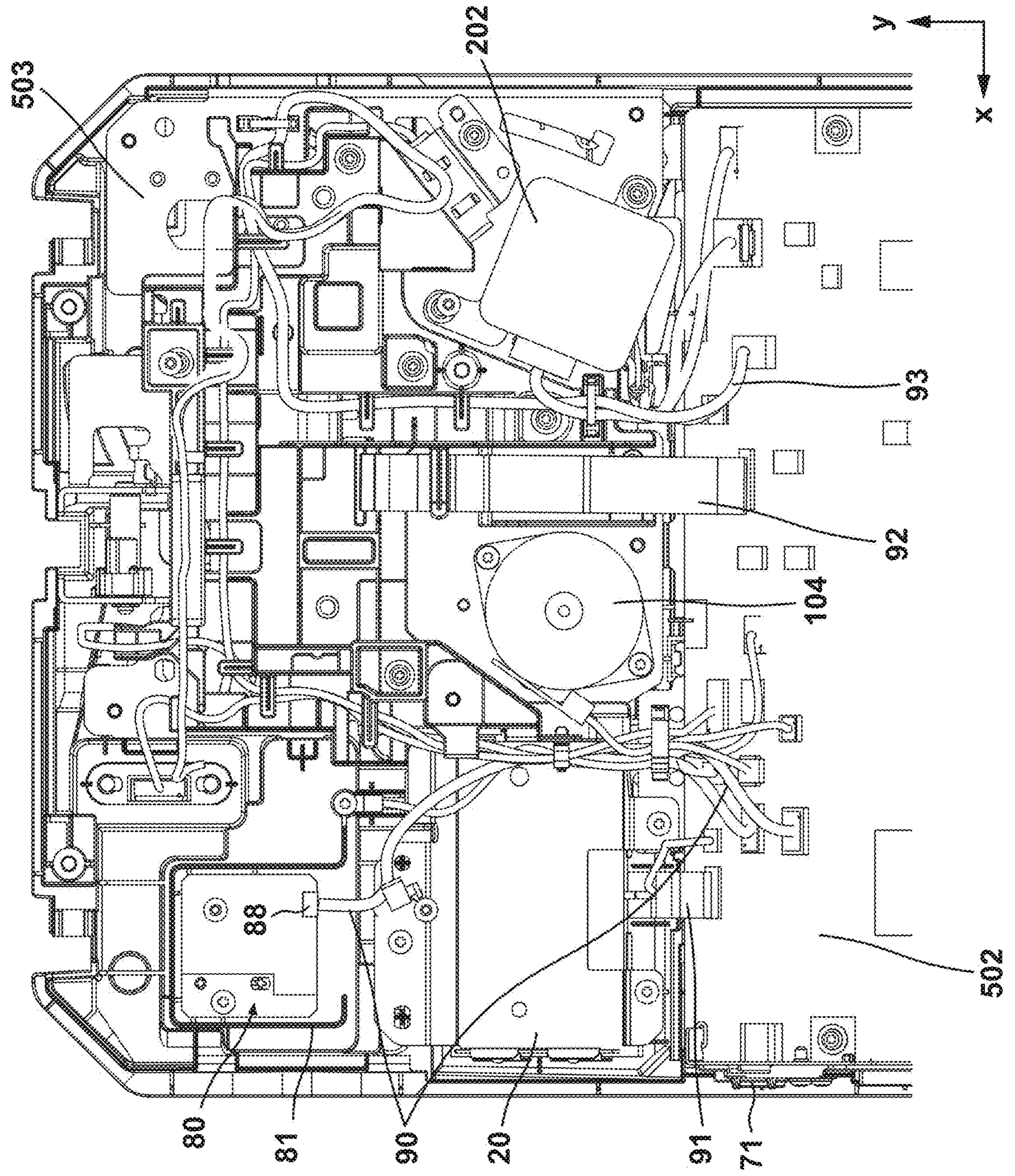
FIG. 12 is a diagram illustrating the position of the Bluetooth module.

As illustrated in FIG. 12, the control board 502 and the Bluetooth module 80 are connected by an electrical cable 90. The electrical cable 90 is a cable for communication between the control board 502 and the Bluetooth module 80, and for supplying power to the Bluetooth module 80. The electrical cable 90 is connected to a connector 88 mounted on a board of the Bluetooth module 80. The control board 502 and the display are connected by the flexible cable 91. The control board 502 and the recording head 201 are connected by a flexible cable 92. The control board 502 and the battery box 602 are connected by the power cable 93. The power cable 93 is disposed further from the Bluetooth module 80 than the flexible cable 91 and the electrical cable 90.

Incidentally, the display is disposed further to the rear, i.e., on the +y side, than the keyboard. Shortening the flexible cable 91 that connects the display and the control board 502 is effective in suppressing noise. The display is disposed near the control board 502 in order to shorten the flexible cable 91. The display may be disposed so that a part thereof overlaps the control board 502 in the y direction, and parts aside from that part do not overlap the control board 502 in the y direction.

Additionally, the display is provided so as not to overlap the main motor 104 when viewed parallel to the z direction. This makes it possible to avoid increasing the thickness of the recording apparatus 1. Additionally, the display is provided so as not to overlap the sub-motor 202 when viewed parallel to the z direction. As a result, the sub-motor 202, which is a large part, does not overlap the display, which makes it possible to avoid increasing the thickness of the recording apparatus 1. In other words, the recording apparatus 1 can be made thinner.

For these reasons, the display is disposed further to the rear of the keyboard, and upstream from the recording position in the conveying direction of the tube T (the −x direction).

Likewise, in order to avoid increasing the thickness of the recording apparatus 1, the main motor 104 and the sub-motor 202 are disposed further to the rear than the keyboard and so as not to overlap the keyboard. Because the main motor 104 and the sub-motor 202 are located at the rear side of the keyboard, the recording position where the recording head 201 records and the cutting position where the cutter cuts the tube T are also located at the rear side of the keyboard. The recording head 201 may be disposed such that a part of the recording head 201 overlaps the keyboard in the y direction, and other parts do not overlap the keyboard in the y direction. The cutter blade (the cutter) may be disposed such that a part of the cutter blade does not overlap the keyboard in the y direction, and parts aside from that part do not overlap the keyboard in the y direction. The recording head 201 may be disposed such that a part of the recording head 201 overlaps the control board 502 in the y direction, and parts aside from that part do not overlap the control board 502 in the y direction. The cutter blade may be disposed such that a part of the cutter blade overlaps the control board 502 in the y direction, and parts aside from that part do not overlap the control board 502 in the y direction.

Figure 13:
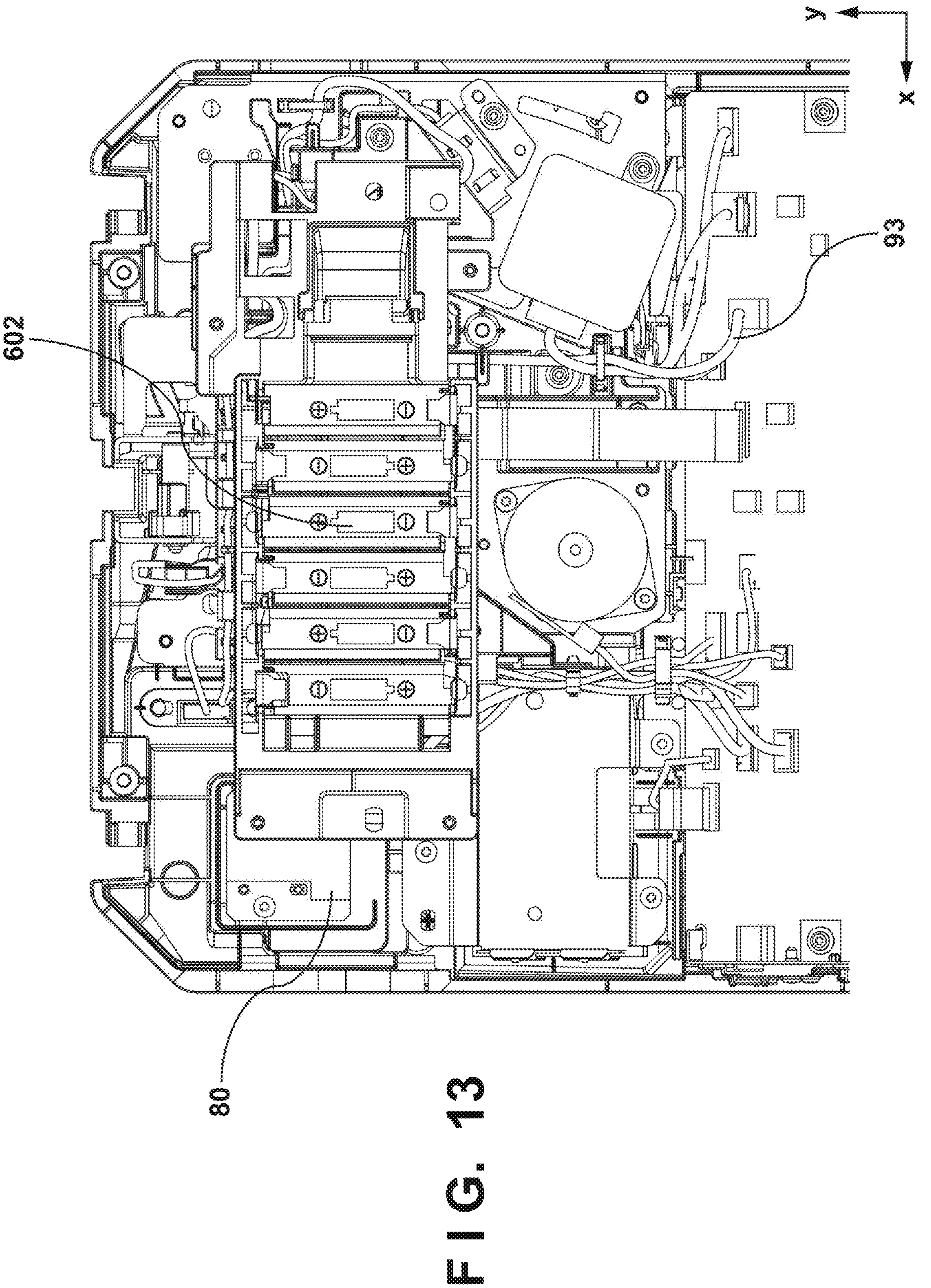
FIG. 13 is a diagram illustrating the position of a battery box and the Bluetooth module.

FIG. 13 is a diagram illustrating a positional relationship between the battery box 602 and the Bluetooth module 80. The battery box 602 is disposed in a position that does not overlap the Bluetooth module 80 in the x direction. When a battery is not inserted into the battery box 602, one end of the power cable 93 (on the battery box 602 side) is in an open state that is not grounded. In this case, the power cable 93 acts as an antenna, which may cause unwanted electromagnetic wave radiation. Accordingly, the power cable 93 is disposed on the side further from the Bluetooth module 80. This makes the Bluetooth module 80 less susceptible to unwanted radiation from the power cable 93.

Figure 14:
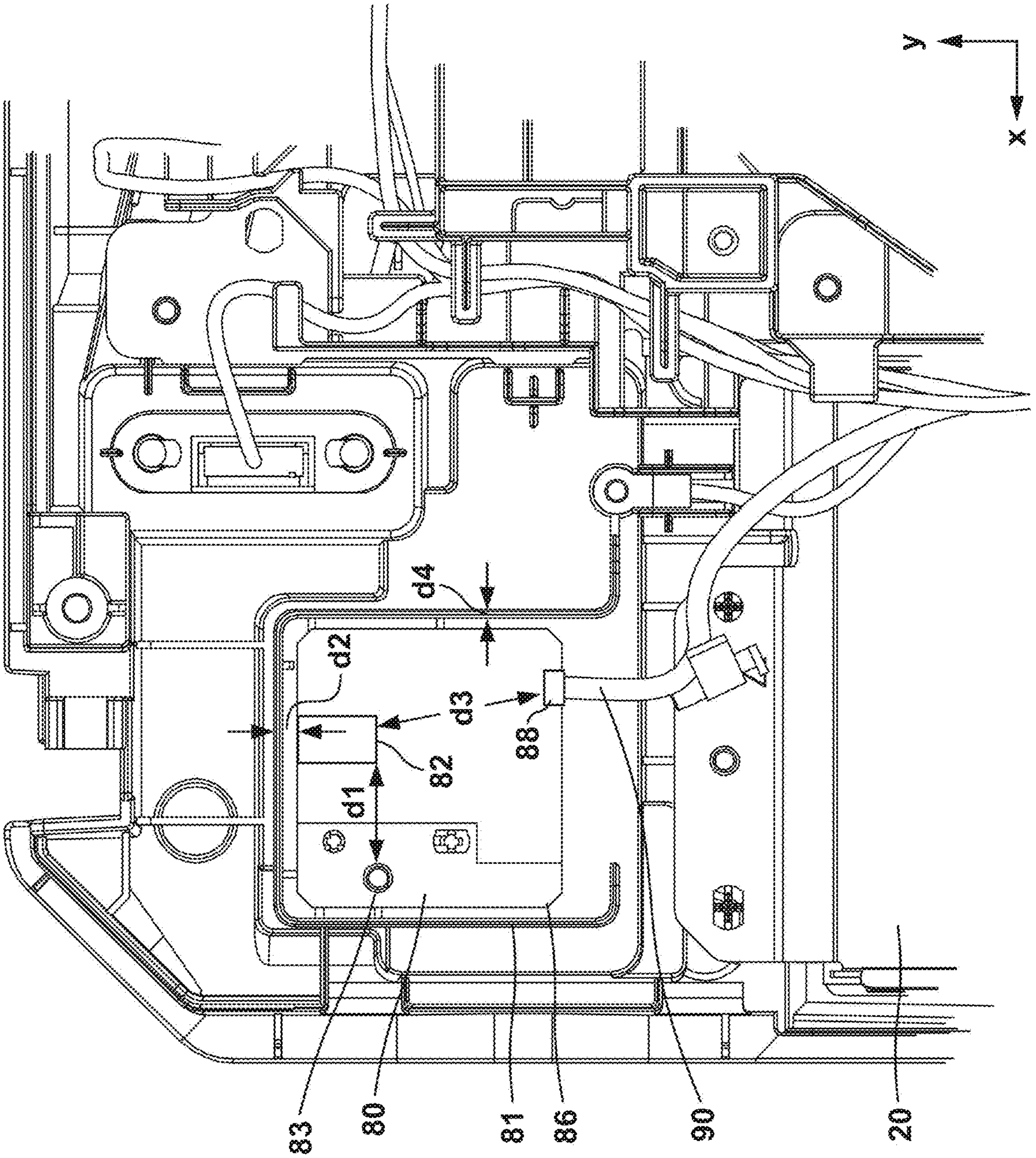
FIG. 14 is a diagram illustrating the position of the Bluetooth module.

FIG. 14 illustrates the periphery of the Bluetooth module 80 in an enlarged manner. A board 86 of the Bluetooth module 80 is fixed to the main body upper unit 500 by a metal screw 83. An antenna 82 that transmits or receives wireless signals through wireless communication according to the Bluetooth standard is mounted on the board 86. The Bluetooth standard specifies the use of the 2.4 GHz frequency (a wavelength of about 13 cm), which is called an unlicensed band or ISM band (industrial, scientific, and medical bands).

Although the Bluetooth standard specifies multiple versions, from the perspective of conserving power, it is desirable to use version 4.0 or later, which corresponds to the Bluetooth Low Energy (BLE) low-power consumption mode. To properly maintain the directionality and gain of the antenna 82, it is desirable that there be no metal within 6 mm from the antenna 82. The maximum communication distance of Bluetooth is generally about 10 m. However, if, for example, metal is present at a position 4 mm from the antenna 82, the signal strength of the wireless signal will weaken and the distance over which normal communication is possible will drop. This is because radio waves emitted from the antenna 82 irradiate the metal, which causes current to flow within the metal, and the metal acts as an antenna and emits radio waves that produce noise. When there is increased distance between the antenna and the metal, the radio waves that the metal receives from the antenna are attenuated, which reduces the effects of radio waves producing noise from the metal. As such, it is necessary for a minimum distance d1 between the antenna 82 and the screw 83 to be at least 6 mm. Note that the screw 83 is the metal closest to the antenna 82. In the present embodiment, d1, which is the minimum distance between the antenna 82 and the screw 83, is 12.2 mm. Although a metal frame is disposed inside the housing, a minimum distance of at least 6 mm is provided between the antenna 82 and the metal frame as well. A minimum distance d3 of at least 6 mm is also provided between the antenna 82 and the connector 88, which includes a metal cover. In the present embodiment, d3 is 14 mm. From the perspective of ensuring a communication distance over which normal communication is possible, it is more preferable for the distance between the metal and the antenna to be at least 10 mm.

As illustrated in FIG. 14, the wall part 81, which is generally U-shaped, is provided in the periphery of the Bluetooth module 80. The wall part 81 is formed from a synthetic resin. It is also necessary to set a distance d2 between the antenna 82 and the wall part 81 to a distance at which the directionality and gain of the antenna 82 are not affected. As such, the minimum distance d2 between the wall part 81 and the antenna 82 is set to at least a thickness d4 of the wall part 81. In the present embodiment, the wall part 81 is constituted by a synthetic resin, the thickness d4 is 1.2 mm, and the distance d2 is 3.2 mm. If the wall part 81 is constituted by a metal, it is necessary to provide a distance of at least 6 mm between the antenna 82 and the metal wall part.

For the present embodiment, measurements were taken using a spectrum analyzer RSA306B-D1 (manufactured by Tektronix) and a receiving antenna 119-6609-00 (manufactured by Tektronix). The output power at 2.402 GHz at equidistant (15 mm) positions from the Bluetooth module 80 was compared for a state in which the Bluetooth module 80 is built into the recording apparatus 1 and a state in which the Bluetooth module 80 is disposed separately. As a result, the output power in the state in which the module is built into the recording apparatus 1 was 97.7% of the output voltage in the separately-disposed state, and attenuation at a level that would affect the maximum communication distance was not observed.

Figure 18:
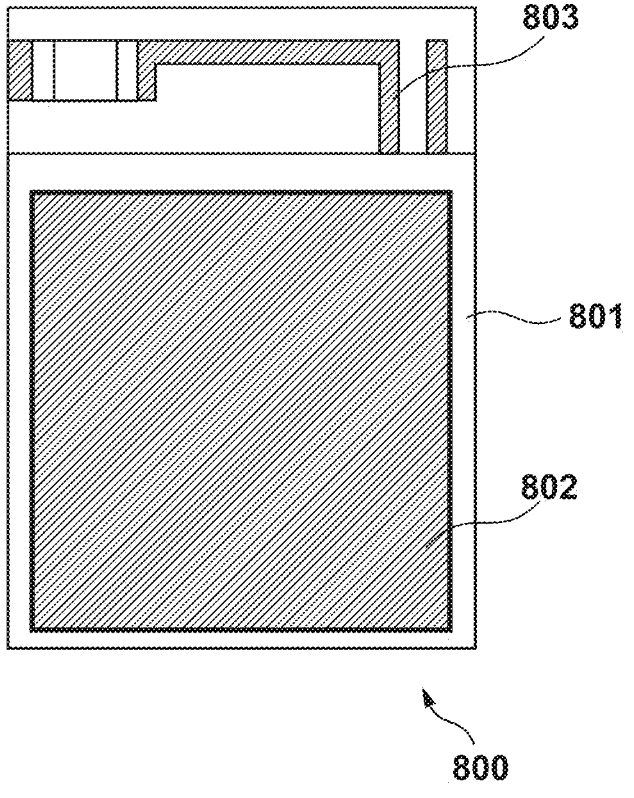
FIG. 18 is a diagram illustrating another example of a Bluetooth module.

Note that another type of module may be employed as the Bluetooth module 80. As illustrated in FIG. 18, a Bluetooth module 800, in which a control chip 802 and an antenna 803 for transmitting and receiving wireless signals are mounted on a board 801, may be purchased from a provider, and may be mounted on a board for connection to the control board 502. The Bluetooth module 800 is provided by a company that has obtained certification in various countries, such as the technical standards conformity certification (technical conformity) in Japan and the Federal Communication Commission (FCC) in the United States. These can be used for conformity and authentication of the main body of the recording apparatus 1. When the Bluetooth module 800 is installed in the interior of the recording apparatus 1, the minimum distance between the antenna 803 and metal part is set to be at least 6 mm, and preferably to at least 10 mm, from the perspective of ensuring a communication distance over which the normal communication is possible. Likewise, the minimum distance between the antenna 803 and the resin parts is set to be at least the thickness of the resin parts.

It is necessary to distance the antenna 82 of the Bluetooth module 80 from the metal components in order to avoid adversely affecting the Bluetooth wireless communication. The arrangement of the Bluetooth module 80 in the recording apparatus 1 serving as a tube printer will be summarized next.

First, the basic structure of the recording apparatus 1 serving as a tube printer will be summarized. The recording apparatus 1 includes the operation unit 10, which includes a keyboard for entering content to be recorded, and the guide unit 400, through which the tube T passes. Furthermore, the recording apparatus 1 includes the recording unit 200, which includes a recording head that records onto the tube T; the cutting unit 300, which includes a cutter that cuts the tube T which has been recorded onto; and a display that displays the content entered from the keyboard.

The keyboard through which the user makes operations is disposed on a front side, which is close to the user.

The control board 502, which requires a certain surface area to be disposed, is disposed on the behind side of the keyboard.

The display is disposed on the rear side of the keyboard. The display is disposed in close proximity to the control board 502 in order to shorten the flexible cable that connects the display and the control board 502 and suppress noise.

The tube T is recorded onto by the recording unit 200 after passing through the guide unit 400, and then the tube T is fully cut or half cut at the cutting position of the cutting unit 300 according to settings made by the user. Accordingly, the guide unit 400, the recording position, and the cutting position are arranged in that order in the −x direction.

The guide unit 400 is disposed on the opposite side from the keyboard, with the display interposed between the guide unit 400 and the keyboard, in the front-rear direction. Because the guide unit 400 does not have a drive source, the guide unit 400 is smaller than the recording unit 200 and the cutting unit 300, which have a drive source. Accordingly, disposing the guide unit 400 further to the rear than the display reduces the size of the recording apparatus 1.

For the above reasons, in the recording apparatus 1, the keyboard, the display, and the guide unit 400 are disposed side by side, in that order, from the side, in the y direction, that is closer to the user operating the apparatus. The guide unit, the recording unit 200, and the cutting unit 300 are disposed side by side, in that order, toward the −x side.

Suitable locations for disposing the Bluetooth module 80 or 800 in the recording apparatus 1 serving as a tube printer having the above-described configuration will be described next.

The control board 502 is disposed on the behind side of the keyboard. The keyboard is inclined downward toward the front side such that the user can make inputs more easily, and there is therefore little space on the behind side of the keyboard. Accordingly, when the Bluetooth module 80 or 800 is disposed in a region that overlaps the keyboard and the control board 502 as seen parallel to the z direction, it is difficult to ensure a sufficient distance from the metal, and there is thus no suitable location.

The main motor 104 is disposed on the behind side of the recording unit 200, the sub-motor 202 is disposed on the behind side of the cutting unit 300, and there are large metal components that should be distanced from the Bluetooth module 80 or 800. Accordingly, when the Bluetooth module 80 or 800 is disposed in a region that overlaps the recording unit 200 or the cutting unit 300 as seen parallel to the z direction, there is no suitable location.

A metal sheet, a driver IC, and a flexible cable are disposed on the behind side of the display. When the Bluetooth module 80 or 800 is disposed in a region that overlaps the display as seen parallel to the z direction, the metal components are near, and there is thus no suitable location.

On the other hand, because the motor and the metal sheet are not disposed in a region that overlaps the guide unit 400 as seen parallel to the z direction, there is a space in which the metal components are not present. This makes it possible to dispose the Bluetooth module 80 or 800 at a sufficient distance from the metal components.

In the front-rear direction (the direction parallel to the y direction), the display is further to the rear than the keyboard. In the front-rear direction (the direction parallel to the y direction), the main motor 104, the sub-motor 202, the recording position, and the cutting position are further to the rear than the keyboard and the control board 502. The display is located further to one side than the recording position in the lengthwise direction of the keyboard (the direction parallel to the x direction), and the cutting position is located further to the other side than the recording position in the lengthwise direction (the direction parallel to the x direction). The Bluetooth module 80 or 800 is located further to one side in the lengthwise direction (the direction parallel to the x direction) than the main motor 104, the sub-motor 202, the recording head 201, and the cutter blade. The Bluetooth module 80 or 800 is further to the rear in the front-rear direction (the direction parallel to the y direction) than the control board 502, the display, and the flexible cable 91. The Bluetooth module 80 or 800 is disposed such that at least a part of the Bluetooth module overlaps the display in the lengthwise direction (the direction parallel to the x direction).

In other words, the Bluetooth module 80 or 800 is disposed further on the +y side than the keyboard, the control board 502, and the display, and further on the +x side than the main motor 104. The Bluetooth module 80 or 800 is disposed such that the entirety of the module overlaps the display in the x direction.

Note that an arrangement may be employed such that a part of the Bluetooth module 80 or 800 overlaps the display in the x direction, and parts aside from that part do not overlap.

By employing such an arrangement, the Bluetooth module 80 or 800 can be disposed in a region where main components were not disposed in conventional tube printer configurations, and the recording can be performed through wireless communication.

The conveying direction of the tube T is described as the −x direction in the present embodiment because the ratio of right-handed users is overwhelmingly high when comparing right-handed and left-handed users. For a right-handed user, it is preferable to be able to set the tube from the right side. However, the conveying direction is not limited to the −x direction, and any form in which the tube is conveyed in the x direction may be used. Even in such a case, disposing the Bluetooth module 80 or 800 upstream from the recording unit in the conveying direction makes it possible to mount the Bluetooth module 80 or 800 in the recording apparatus 1.

Although the present embodiment describes a form in which a wireless connection and a wired connection can be used to transfer the recording data from a host computer to the tube printer, this is merely one example. A form in which the data can only be transferred through a wireless connection may be employed.

Controller

Figure 15:
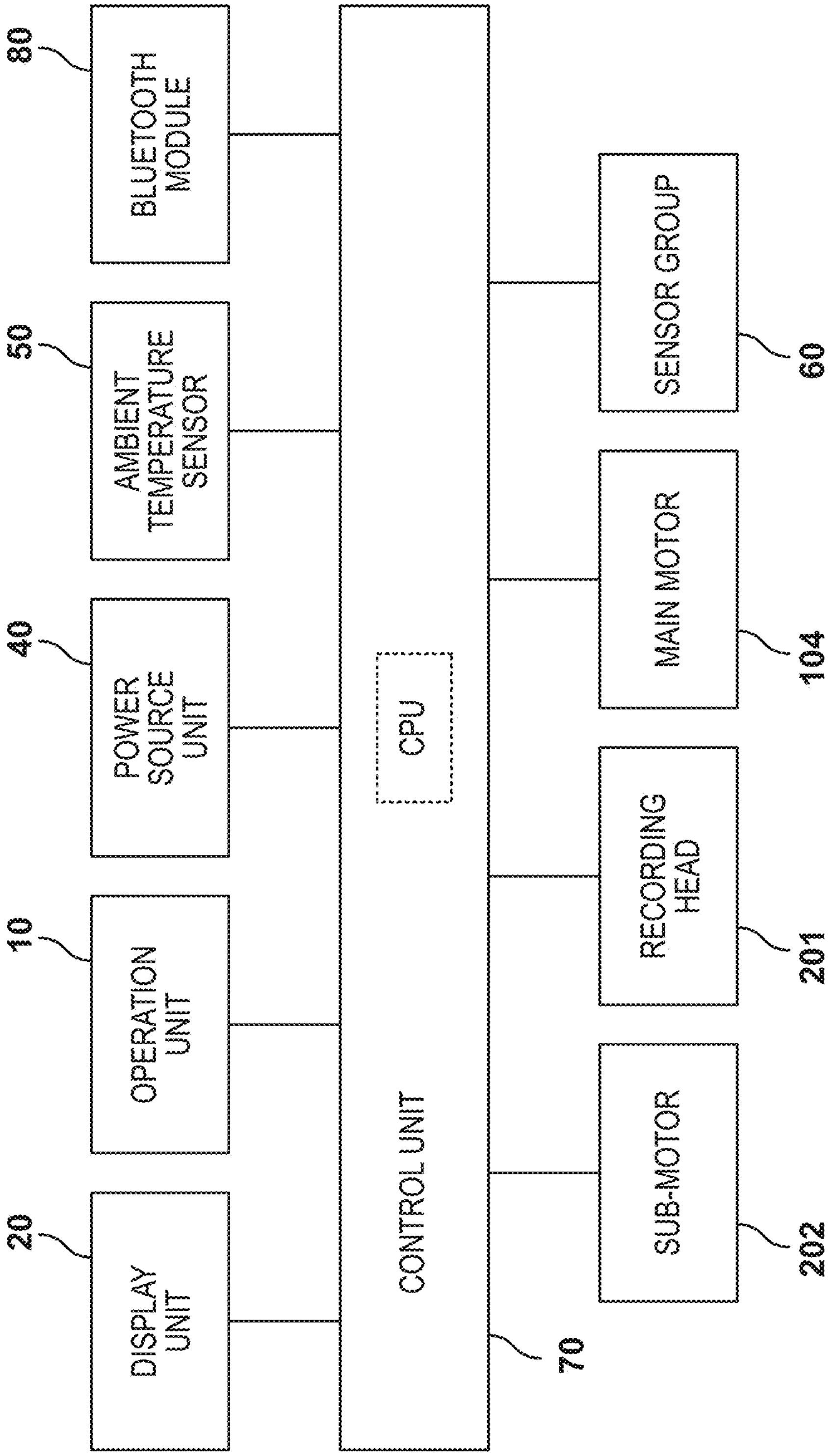
FIG. 15 is a block diagram illustrating a controller.

FIG. 15 illustrates the controller of the recording apparatus 1 as a block diagram. The power source unit 40 is a power source circuit that supplies power required for the operations of the operation unit 10, the display unit 20, the recording head 201, the main motor 104, the sub-motor 202, an ambient temperature sensor 50, a sensor group 60, and the control unit 70 including a CPU, and the like provided in the recording apparatus 1. The control unit 70 controls recording operations performed by the recording unit 200, controls the display in the display unit 20, and the like. The ambient temperature sensor 50 is a sensor that detects the temperature of the environment in which the recording apparatus 1 is installed. The ambient temperature sensor 50 is disposed in a position that is less susceptible to heat from the heater inside the recording apparatus 1. The sensor group 60 includes a plurality of medium sensors that sense a recording medium such as the tube T. The Bluetooth module 80 is a board including a wireless communication circuit that executes wireless communication with the host computer.

Apart from the Bluetooth module 80, the controller may include a wired connection circuit that connects using USB (registered trademark). In this case, the recording apparatus 1 can also receive and record recording data transferred through wired communication from the host computer over a USB cable. Wired communication enables more reliable data transfer than wireless communication.

The control unit 70 sets the driving pulses that drive the thermal element of the recording head 201 based on the temperature detected by the ambient temperature sensor 50. When the temperature detected by the ambient temperature sensor 50 is low, the temperature of the tube T is lower than an appropriate temperature. As such, more heat is applied to the ink ribbon R. For example, increasing the driving pulses (energization time) of the thermal element of the recording head 201, appropriate recording can be performed even in cold environments. Additionally, the control unit 70 is mounted on the control board 502, and is disposed in a region that overlaps the keyboard when viewed parallel to the z direction.

Flowchart

Figure 16:
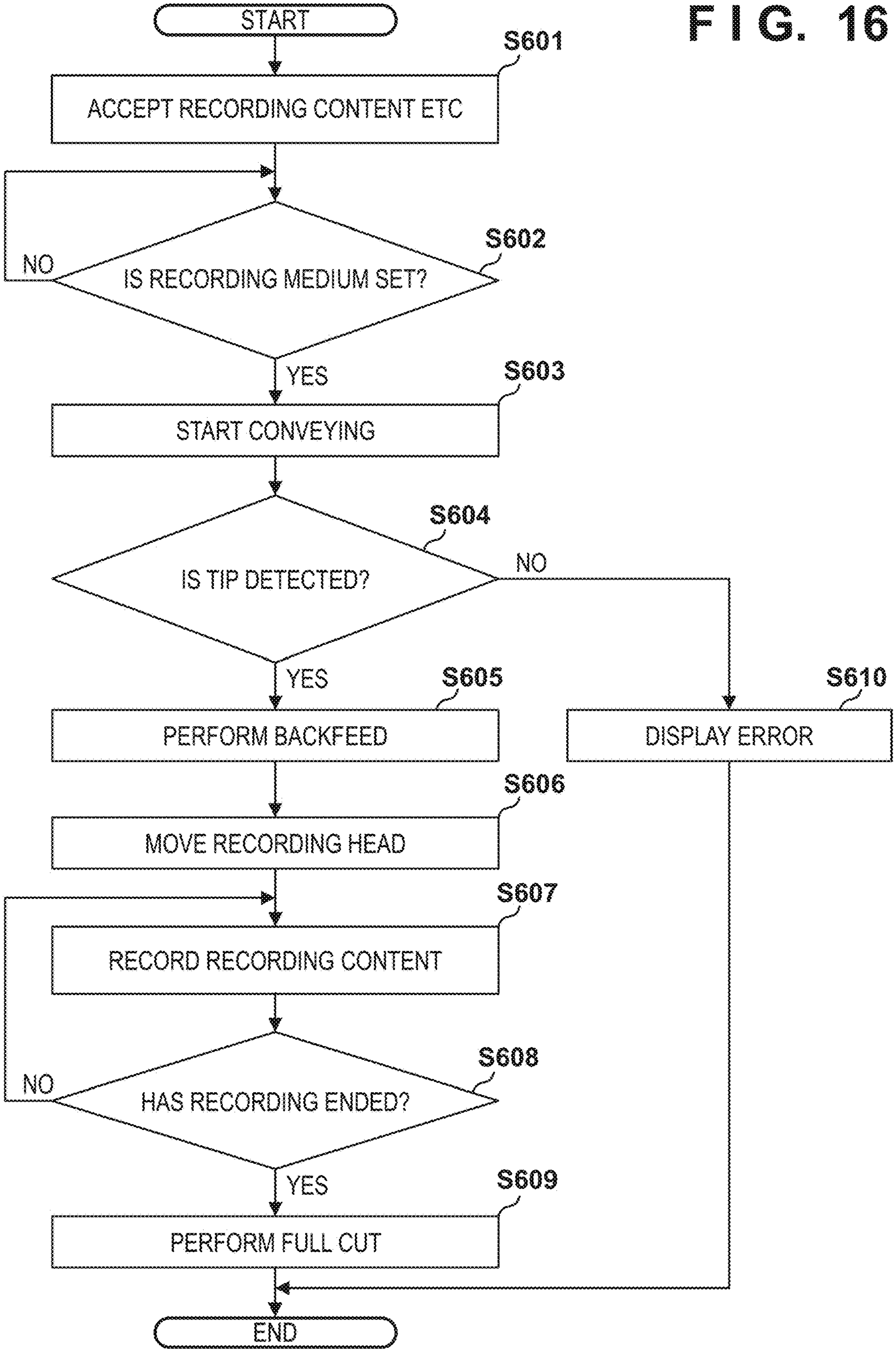
FIG. 16 is a flowchart illustrating a recording method.

FIG. 16 is a flowchart illustrating a recording method for recording an image onto the tube T. Before the recording, the user sets the tube T in the recording apparatus 1. When the user switches the opening/closing cover 2 from a closed state to an open state, the first roller 101*b* moves away from the first roller 101*a*. When the user sets the tube T between the first roller 101*a* and the first roller 101*b* and switches the opening/closing cover 2 from an open state to a closed state, the first roller 101*b* moves toward the first roller 101*a*, and the first roller 101*a* and the first roller 101*b* pinch the tube T.

In step S601, the control unit 70 accepts recording content and the like entered from the keyboard of the operation unit 10. Alternatively, recording content and the like transmitted from a device such as a smartphone connected over Bluetooth are accepted. Alternatively, recording data transferred from a host computer connected by a wire is accepted. The recording data includes content to be recorded onto the tube T, the number of pages to be recorded, and a text size. Upon completing the entry of the recording content, the user inserts the tube T into the guide unit 400, and the tube T is detected by a medium sensor provided in the guide unit 400. The medium sensor is a sensor included in the sensor group 60.

In S602, the control unit 70 determines whether the tube T has been set in the guide unit 400 based on whether the medium sensor has detected the tube T. Upon detecting that the tube T is set in the guide unit 400, the control unit 70 moves to S603.

In S603, the control unit 70 starts the main motor 104 and starts conveying the tube T by rotating the first rollers 101*a* and 101*b*.

In step S604, the control unit 70 determines whether the tip of the tube T has been detected by another medium sensor provided downstream from the first rollers 101*a* and 101*b*. If the tip is not detected within a predetermined length of time following the start of conveying, the control unit 70 moves to S610, where an error message is displayed in the display. In this case, the user sets the tube T in the guide unit 400 again in accordance with the error message. On the other hand, if the tip is detected within the predetermined length of time following the start of conveying, the control unit 70 moves to S605.

In S605, the control unit 70 reverses the main motor 104 and feeds the tube T backwards. This positions the tip of the tube T accurately relative to a recording start position of the recording head 201.

In S606, the control unit 70 drives the sub-motor 202 to move the recording head 201 from the retracted position to the recording position. The tube T and the ink ribbon R are sandwiched between the platen roller 102 and the recording head 201 as a result.

In S607, the control unit 70 energizes the plurality of thermal elements in the recording head 201 in accordance with the recording content entered by the user, and records the recording content onto the tube T. Note that if all the recording cannot be completed through a single instance of recording processing, the conveying of the tube T and the recording by the recording head 201 are repeated. If a half-cut is required, the control unit 70 drives the cutting unit 300 to perform the half-cut.

In S608, the control unit 70 determines whether the recording of the recording content onto the tube T has ended. Once the recording ends, the recording head 201 moves to the retracted position, and the control unit 70 moves to S609.

In S609, the control unit 70 makes a full cut of the tube T by conveying the tube T to the cutting unit 300 using the main motor 104, starting the sub-motor 202, and driving the cutting unit 300. After the full cut is made, the recording operations end.

As described above, according to the present embodiment, a tube printer provided with a wireless communication circuit using Bluetooth can be provided.

The invention is not limited to the foregoing embodiments, and various variations/changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A tube printer comprising:
a motor configured to drive a conveying roller that conveys a tube;
a print head configured to perform printing on the tube conveyed by the conveying roller using a thermal transfer method;
a cutter configured to cut the tube on which printing has been performed by the print head;
a plurality of hard keys for inputting information, arranged in a QWERTY layout in a lengthwise direction;
a control board configured to receive information input from the plurality of hard keys and control the motor and the print head; and
a display configured to display information based on information sent from the control board,
wherein the control board is disposed behind the plurality of hard keys,
wherein the motor, the print head, the cutter, and the display are located further to a rear than the plurality of hard keys and the control board in a front-rear direction of the tube printer, and the display is located further to one side than the motor, the print head, and the cutter in the lengthwise direction,
wherein the tube printer includes an antenna for communicating data to be printed by the print head via Bluetooth, and
wherein the antenna is located further to the rear than the display in the front-rear direction, and is located further to the one side than the motor, the print head, and the cutter in the lengthwise direction.

2. A tube printer comprising:
a motor configured to drive a conveying roller that conveys a tube;
a print head configured to perform printing on the tube conveyed by the conveying roller using a thermal transfer method;
a cutter configured to cut the tube on which printing has been performed by the print head;
a plurality of hard keys for inputting information;
a control board configured to receive information input from the plurality of hard keys and control the motor and the print head; and
a display configured to display information based on information sent from the control board,
wherein the control board is disposed behind the plurality of hard keys,
wherein the motor, the print head, the cutter, and the display are located further to a rear than the plurality of hard keys and the control board in a front-rear direction of the tube printer, and the display is located further to a right side of the tube printer than the motor, the print head, and the cutter,
wherein the tube printer includes an antenna for communicating data to be printed by the print head via Bluetooth, and
wherein the antenna is located further to the rear than the display in the front-rear direction, and is located further to the right side of the tube printer than the motor, the print head, and the cutter.

3. A tube printer for printing on a tube, comprising:
a plurality of hard keys arranged in a QWERTY layout in a lengthwise direction;

a control board provided behind the plurality of hard keys, the control board configured to control the tube printer based on instructions from an operator via the plurality of hard keys;

a display provided further to a rear side of the tube printer than the plurality of hard keys in a front-rear direction of the tube printer, the display configured to perform display corresponding to operations of the plurality of hard keys by the operator;

a tube insertion port into which a tube is inserted, provided further to the rear side of the tube printer than the control board and provided on one side in the lengthwise direction of the tube printer;

a print head configured to perform printing on the tube inserted from the tube insertion port, provided further to the rear side of the tube printer than the control board;

a tube discharge port from which the tube is discharged, provided further to the rear side of the tube printer than the control board and provided on an other side in the lengthwise direction of the tube printer;

a cutter configured to cut the tube printed by the print head at the tube discharge port; and an antenna for wirelessly communicating instructions from the operator to the control board via Bluetooth, provided further to the rear side of the tube printer than the display and provided at a position away from the print head toward the one side in the lengthwise direction.

* * * * *